(12) United States Patent
Royer

(10) Patent No.: US 12,361,313 B2
(45) Date of Patent: Jul. 15, 2025

(54) TECHNIQUES FOR QUANTUM ERROR CORRECTION USING MULTIMODE GRID STATES AND RELATED SYSTEMS AND METHODS

(71) Applicant: Yale University, New Haven, CT (US)

(72) Inventor: Baptiste Royer, New Haven, CT (US)

(73) Assignee: Yale University, New Haven, CT (US)

( * ) Notice: Subject to any disclaimer, the term of this patent is extended or adjusted under 35 U.S.C. 154(b) by 0 days.

(21) Appl. No.: 18/722,894

(22) PCT Filed: Dec. 21, 2022

(86) PCT No.: PCT/US2022/053675
§ 371 (c)(1),
(2) Date: Jun. 21, 2024

(87) PCT Pub. No.: WO2023/122187
PCT Pub. Date: Jun. 29, 2023

(65) Prior Publication Data
US 2024/0420007 A1    Dec. 19, 2024

Related U.S. Application Data

(60) Provisional application No. 63/292,608, filed on Dec. 22, 2021.

(51) Int. Cl.
*G06N 10/70* (2022.01)
*G06N 10/00* (2022.01)
*G06N 10/40* (2022.01)

(52) U.S. Cl.
CPC ............. *G06N 10/70* (2022.01); *G06N 10/40* (2022.01)

(58) Field of Classification Search
CPC ........ G06N 10/70; G06N 10/40; H03M 13/00
See application file for complete search history.

(56) References Cited

U.S. PATENT DOCUMENTS

| 5,323,344 A | 6/1994 | Katayama et al. |
| 6,128,764 A | 10/2000 | Gottesman |

(Continued)

FOREIGN PATENT DOCUMENTS

| CN | 102498496 A | 6/2012 |
| CN | 104881268 A | 9/2015 |

(Continued)

OTHER PUBLICATIONS

International Search Report and Written Opinion for International Application No. PCT/US2016/064609 mailed Jul. 31, 2017.

(Continued)

*Primary Examiner* — Justin R Knapp
(74) *Attorney, Agent, or Firm* — Wolf, Greenfield & Sacks, P.C.

(57) ABSTRACT

Techniques are described for implementing a class of multimode bosonic codes that protect against errors within an ancilla qubit coupled to a bosonic system, that can be realized experimentally. A logical qubit state is represented by the states of multiple different modes of one or more bosonic systems, which may include multiple modes of a single bosonic system and/or single modes from multiple bosonic systems. Techniques for correcting errors are also described. In particular, a series of operations are described that autonomously detect and correct errors by repeatedly performing a sequence of operations that are each applied to the multiple bosonic modes and/or to the ancilla qubit that is coupled to each of the bosonic modes. The codes allow ancilla errors to propagate to the modes of the bosonic system as correctable errors, where they can be corrected, instead of presenting as logical errors in the ancilla qubit.

20 Claims, 11 Drawing Sheets

(56) References Cited

U.S. PATENT DOCUMENTS

| | | | |
|---|---|---|---|
| 7,498,832 | B2 | 3/2009 | Baumgardner et al. |
| 8,242,799 | B2 | 8/2012 | Pesetski et al. |
| 8,294,138 | B2 | 10/2012 | Farinelli et al. |
| 8,508,280 | B2 | 8/2013 | Naaman et al. |
| 9,152,924 | B2 | 10/2015 | Bonderson et al. |
| 9,858,531 | B1 * | 1/2018 | Monroe ................. G06N 10/70 |
| 10,635,989 | B2 * | 4/2020 | Blais .................... H10N 60/805 |
| 10,885,459 | B2 | 1/2021 | Biamonte et al. |
| 11,037,068 | B2 | 6/2021 | Girvin et al. |
| 11,782,779 | B2 | 10/2023 | Albert et al. |
| 11,907,808 | B2 * | 2/2024 | Schmitz ................. G06N 10/80 |
| 11,909,451 | B2 | 2/2024 | Noh et al. |
| 2010/0295598 | A1 | 11/2010 | Darabi et al. |
| 2012/0033697 | A1 | 2/2012 | Goyal et al. |
| 2012/0204296 | A1 | 8/2012 | Prater et al. |
| 2014/0059099 | A1 | 2/2014 | Liberty et al. |
| 2014/0365843 | A1 | 12/2014 | Ashikhmin |
| 2015/0358022 | A1 | 12/2015 | Mcdermott, III et al. |
| 2016/0233965 | A1 | 8/2016 | Medford |
| 2016/0254646 | A1 | 9/2016 | Li et al. |
| 2017/0104493 | A1 | 4/2017 | Goto |
| 2018/0032895 | A1 | 2/2018 | Jiang et al. |
| 2018/0241408 | A1 | 8/2018 | Hayashi et al. |
| 2018/0247217 | A1 | 8/2018 | Heeres et al. |
| 2018/0314969 | A1 | 11/2018 | Thornton et al. |
| 2019/0020346 | A1 | 1/2019 | Wang et al. |
| 2020/0242500 | A1 | 7/2020 | Girvin et al. |
| 2020/0334101 | A1 | 10/2020 | Albert et al. |
| 2022/0190933 | A1 | 6/2022 | Noh et al. |

FOREIGN PATENT DOCUMENTS

| | | |
|---|---|---|
| JP | 2014-090341 A | 5/2014 |
| JP | 2015-534410 A | 11/2015 |
| WO | WO 2016/138378 A1 | 9/2016 |
| WO | WO 2017/065856 A1 | 4/2017 |
| WO | WO 2017/139683 A1 | 8/2017 |
| WO | WO 2018/089850 A1 | 5/2018 |
| WO | WO 2020/198581 A1 | 10/2020 |

OTHER PUBLICATIONS

International Preliminary Report on Patentability for International Application No. PCT/US2016/064609 mailed Jun. 14, 2018.

Extended European Search Report for European Application No. 16892925.5, dated Jun. 28, 2019.

International Search Report and Written Opinion for International Application No. PCT/US2019/012438, mailed Aug. 12, 2019.

International Preliminary Report on Patentability for International Application No. PCT/US2019/012438, mailed Jul. 16, 2020.

Extended European Search Report for European Application No. 19756883.5, dated Aug. 6, 2021.

International Search Report and Written Opinion in International Application No. PCT/US2020/025204, mailed Jun. 23, 2020.

International Preliminary Report on Patentability in International Application No. PCT/US2020/025204, mailed Oct. 7, 2021.

Extended European Search Report for European Application No. 20776963.9, dated Nov. 25, 2022.

International Search Report and Written Opinion for International Application No. PCT/US2022/053675, mailed Apr. 6, 2023.

Aaronson et al., BosonSampling with lost photons. Phys. Rev. A. Jan. 21, 2016;93:012335.

Aaronson et al., The computational complexity of linear optics. Proceedings of the 43rd Annual ACM Symposium on Theory of Computing, STOC. Jun. 2011:333-42.

Agarwal et al., Generation of pair coherent states and squeezing via the competition of four-wave mixing and amplified spontaneous emission. Physical review letters. Aug. 18, 1986;57(7):827.

Albert et al., Performance and structure of single-mode bosonic codes. Physical Review A. Mar. 30, 2018;97(3):032346.

Albert, Lindbladians with multiple steady states: theory and applications. Yale University Dissertation. May 2017, 134 pages.

Albert, Proposal for a Logical Qubit Encoded into a Stabilized Manifold in Two Bosonic Modes. APS March Meeting 2018. Abstract Id V33.007, 1 page.

Andrews et al., Bidirectional and efficient conversion between microwave and optical light. Nature Physics. Apr. 2014;10(4):321-6.

Aoki et al., Quantum error correction beyond qubits. Nature Physics. Aug. 2009;5(8):541-6.

Arrazola et al., Machine learning method for state preparation and gate synthesis on photonic quantum computers. Quantum Science and Technology. Jan. 22, 2019;4:024004.

Baragiola et al., All-Gaussian universality and fault tolerance with the Gottesman-Kitaev-Preskill code. Physical review letters. Nov. 13, 2019;123(20):200502.

Barends et al., Coherent Josephson qubit suitable for scalable quantum integrated circuits. Physical review letters. Aug. 22, 2013;111(8):080502.

Barends et al., Superconducting quantum circuits at the surface code threshold for fault tolerance. Nature. Apr. 2014;508(7497):500-3.

Barut et al., New "coherent" states associated with non-compact groups. Communications in Mathematical Physics. Mar. 1, 1971;21(1):41-55.

Bennet et al., Mixed-state entanglement and quantum error correction. Physical Review A. Nov. 1, 1996;54(5):3824-51.

Bény et al., General conditions for approximate quantum error correction and near-optimal recovery channels. Physical review letters. Mar. 23, 2010;104(12):120501.

Bény, Perturbative quantum error correction. Physical review letters. Aug. 16, 2011;107(8):080501.

Bergmann et al., Quantum error correction against photon loss using NOON states. Phys. Rev. A. Jul. 7, 2016; 94:012311. https://doi.org/10.1103/PhysRevA.94.012311.

Bertet et al., Direct measurement of the Wigner function of a one-photon Fock state in a cavity. Physical Review Letters. Oct. 28, 2002;89(20):200402.

Børkje et al., Observability of radiation-pressure shot noise in optomechanical systems. Physical Review A. Jul. 15, 2010;82(1):013818.

Børkje et al., Signatures of nonlinear cavity optomechanics in the weak coupling regime. Physical review letters. Aug. 2, 2013;111(5):053603.

Boulant et al., Experimental implementation of a concatenated quantum error-correcting code. Physical review letters. Apr. 8, 2005;94(13):130501.

Bradley et al., Microwave cavity searches for dark-matter axions. Reviews of Modern Physics. Jun. 12, 2003;75(3):777-817.

Braunstein et al., Quantum information with continuous variables. Reviews of Modern Physics. Jun. 29, 2005;77(2):513-77.

Braunstein Quantum error correction for communication with linear optics. Nature. Jul. 2, 1998; 394:47-9.

Braunstein, Error Correction for Continuous Quantum Variables. Phys. Rev. Lett. May 4, 1998;80(18):4084-7.

Brecht et al., Multilayer microwave integrated quantum circuits for scalable quantum computing. NPJ Quantum Information. Feb. 23, 2016;2:16002.

Cai et al., Bosonic quantum error correction codes in superconducting quantum circuits. Fundamental Research. Jan. 1, 2021;1(1):50-67.

Campagne-Ibarq et al., Quantum error correction of a qubit encoded in grid states of an oscillator. Nature. Aug. 20, 2020;584(7821):368-72.

Chembo et al., Modal expansion approach to optical-frequency-comb generation with monolithic whispering-gallery-mode resonators. Physical Review A. Sep. 7, 2010;82(3):033801.

Chembo et al., Spatiotemporal Lugiato-Lefever formalism for Kerr-comb generation in whispering-gallery-mode resonators. Physical Review A. May 31, 2013;87(5):053852.

Chen, Study of De-coherence of Coupled Systems of Charge Qubits and Nonlinear Nanomechanical Resonators. China Master's Thesis Full-Text Database (Basic Sciences Volume). Mar. 15, 2014;3:1-48.

(56) References Cited

OTHER PUBLICATIONS

Chia Verini et al., Realization of quantum error correction. Nature. Dec. 2004;432(7017):602-5.
Chiorescu et al., Coherent dynamics of a flux qubit coupled to a harmonic oscillator. Nature. Sep. 2004;431(7005):159-62.
Chuang et al., Bosonic quantum codes for amplitude damping. Physical Review A. Aug. 1, 1997;56(2):1114.
Cirac et al., Enforcing coherent evolution in dissipative quantum dynamics. Science. Aug. 30, 1996;273(5279):1207-10.
Cirac et al., Quantum state transfer and entanglement distribution among distant nodes in a quantum network. Physical Review Letters. Apr. 21, 1997;78(16):3221-4.
Clerk et al., Introduction to quantum noise, measurement, and amplification. Reviews of Modern Physics. Apr. 15, 2010;82(2):1155-208.
Cochrane et al., Macroscopically distinct quantum-superposition states as a bosonic code for amplitude damping. Phys. Rev. 23 A. Apr. 1, 1999;59(4):2631-4. arXiv.quant-ph/9809037v2.
Coen et al., Modeling of octave-spanning Kerr frequency combs using a generalized mean-field Lugiato-Lefever model. Optics letters. Jan. 1, 2013;38(1):37-9.
Córcoles et al., Demonstration of a quantum error detection code using a square lattice of four superconducting qubits. Nature communications. Apr. 29, 2015;6:6979.
Cory et al., Experimental quantum error correction. Physical Review Letters. Sep. 7, 1998;81(10):2152-5.
Crépeau et al., Approximate quantum error-correcting codes and secret sharing schemes. Advances in Cryptology: Lecture Notes in Computer Science. 2005;3494:285-301.
De Neeve et al., Error correction of a logical grid state qubit by dissipative pumping. Nature Physics. Mar. 2022;18(3):296-300.
Devoret et al., Superconducting circuits for quantum information: an outlook. Science. Mar. 8, 2013;339(6124):1169-74.
Dong, The q-Deformed Superposition States and Their Properties. Acta Optica Sinica. 1999;19(11):1452-8.
Duivenvoorden et al., Single-mode displacement sensor. Physical Review A. Jan. 5, 2017;95(1):012305. arXiv:1603.02242v4 [quant-ph].
Eaton et al., Gottesman-Kitaev-Preskill State Preparation by Photon Catalysis. New Journal of Physics. Nov. 18, 2019;21:113034.
Eisert et al. Distilling Gaussian states with Gaussian operations is impossible. Phys. Rev. Lett. Sep. 4, 2002;89:137903. https://doi.org/10.1103/PhysRevLett.89.137903.
Faist et al., Continuous symmetries and approximate quantum error correction. Phys. Rev. X. Oct. 26, 2020;10:041018. arXiv:1902.07714v1 [quant-ph].
Fletcher et al., Optimum quantum error recovery using semidefinite programming. Physical Review A. Jan. 31, 2007;75(1):012338.
Flühmann et al., Direct characteristic-function tomography of quantum states of the trapped-ion motional oscillator. Physical Review Letters. Jul. 21, 2020;125(4):043602.
Flühmann et al., Encoding a qubit in a trapped-ion mechanical oscillator. Nature. Feb. 27, 2019;566:513-7.
Flühmann et al., Sequential modular position and momentum measurements of a trapped ion mechanical oscillator. Phys. Rev. X. Apr. 2, 2018; 8:021001.
Flurin et al., Superconducting quantum node for entanglement and storage of microwave radiation. Physical review letters. Mar. 4, 2015;114(9):090503.
Fowler Surface codes: Towards practical large-scale quantum computation. Phys. Rev. A. Sep. 18, 2012; 86(032324): 48 pages.
Frattini et al., 3-wave mixing Josephson dipole element. Applied Physics Letters. May 29, 2017;110(22):222603.
Fukui et al., Analog quantum error correction with encoding a qubit into an oscillator. Phys. Rev. Lett. Nov. 10, 2017;119:180507.
Gao et al., Noise properties of superconducting coplanar waveguide microwave resonators. Applied Physics Letters. Mar. 5, 2007;90(10):102507.

Girvin, Basic concepts in quantum information. Strong Light-Matter Coupling: From Atoms to Solid-State Systems. 2013:155-206.
Girvin, Wiring Up Quantum Systems: Circuit QED with Artificial Atoms and Microwave Photons. Conference on Coherence and Quantum Optics. Jun. 17, 2013:M4B-1.
Gottesman et al., Encoding a qubit in an oscillator. Physical Review A. Jun. 11, 2001;64(1):012310.
Gottesman Stabilizer codes and quantum error correction. Ph.D. Thesis, California Institute of Technology. May 21, 1997; 122 pages.
Gottesman, An introduction to quantum error correction and fault-tolerant quantum computation. Quantum information science and its contributions to mathematics, Proceedings of Symposia in Applied Mathematics Apr. 2010;68:13-58.
Grassl et al., Quantum error-correcting codes for qudit amplitude damping. IEEE Transactions on Information Theory. Jun. 2018;64(6):4674-85.
Hachohen-Gourgy et al.. Cooling and autonomous feedback in a bose-hubbard chain with attractive interactions. Physical review letters. Dec. 9, 2015;115(24):240501.
Hafezi et al., Chemical potential for light by parametric coupling. Physical Review B. Nov. 19, 2015;92(17):174305.
Harrington et al., Achievable rates for the Gaussian quantum channel. Phys. Rev. A. May 17, 2001;64:062301. https://doi.org/10.1103/PhysRevA.64.062301.
Hatridge et al., Quantum back-action of an individual variable-strength measurement. Science. Jan. 11, 2013;339(6116):178-81.
Hayden et al., Error Correction of Quantum Reference Frame Information. PRX Quantum. Feb. 18, 2021;2:010326. arXiv:1709.04471v1 [quant-ph].
Hayden et al., Spacetime replication of continuous variable quantum information. New J. Phys. Aug. 24, 2016;18(8):083043.
Heeres et al., Cavity state manipulation using photon-number selective phase gates. Physical review letters. Sep. 22, 2015;115(13):137002.
Helmer et al., Quantum nondemolition photon detection in circuit QED and the quantum Zeno effect. Physical Review A. May 20, 2009;79(5):052115.
Hofheinz et al., Synthesizing arbitrary quantum states in a superconducting resonator. Nature. May 2009;459(7246):546.
Holevo One-mode quantum Gaussian channels: Structure and quantum capacity. Problems of Information Transmission. Mar. 2007;43(1):1-11.
Home et al., Complete methods set for scalable ion trap quantum information processing. Science. Sep. 4, 2009;325(5945):1227-30.
Houck et al., Generating single microwave photons in a circuit. Nature. Sep. 2007;449(7160):328-31.
Hu et al., Demonstration of quantum error correction and universal gate set operation on a binomial bosonic logical qubit. Nature Physics. Feb. 11, 2019; 15:503-8.
Huh et al., Boson sampling for molecular vibronic spectra. Nature Photonics. Aug. 24, 2015;9:615-20.
Ince et al., The case for open computer programs. Nature. Feb. 2012;482(7386):485-8.
Kelly et al., State preservation by repetitive error detection in a superconducting quantum circuit. Nature. Mar. 2015;519(7541):66.
Kienzler et al., Quantum harmonic oscillator state synthesis by reservoir engineering. Science. Jan. 2, 2015;347(6217):53-6.
Kirchmair et al., Observation of quantum state collapse and revival due to the single-photon Kerr effect. Nature. Mar. 2013;495(7440):205-9.
Knill et al. A scheme for efficient quantum computation with linear optics. Nature, Jan. 4, 2001; 409(6816):46-52.
Knill et al., Theory of quantum error-correcting codes. Physical Review A. Feb. 1, 1997;55(2):900.
Koch et al., Charge-insensitive qubit design derived from the Cooper pair box. Physical Review A. Oct. 12, 2007;76(4):042319.
Korotkov, Flying microwave qubits with nearly perfect transfer efficiency. Physical Review B. Jul. 25, 2011;84(1):014510.
Krastanov et al., Universal control of an oscillator with dispersive coupling to a qubit. Physical Review A. Oct. 21, 2015;92(4):040303.

(56) References Cited

OTHER PUBLICATIONS

Laflamme et al., Perfect quantum error correcting code. Physical Review Letters. Jul. 1, 1996;77(1):198-201.
Lamont et al., Route to stabilized ultrabroadband microresonator-based frequency combs. Optics letters. Sep. 15, 2013;38(18):3478-81.
Lamoreaux et al., Analysis of single-photon and linear amplifier detectors for microwave cavity dark matter axion searches. Physical Review D. Aug. 23, 2013;88(3):035020.
Lassen et al., Quantum optical coherence can survive photon losses using a continuous-variable quantum erasure-correcting code. Nature Photonics. Oct. 2010;4(10):700-5.
Leghtas et al., Confining the state of light to a quantum manifold by engineered two-photon loss. Science. Feb. 20, 2015;347(6224):853-7.
Leghtas et al., Hardware-efficient autonomous quantum memory protection. Physical Review Letters. Sep. 20, 2013;111(12):120501.
Leghtas et al., Stabilizing a Bell state of two superconducting qubits by dissipation engineering. Physical Review A. Aug. 27, 2013;88(2):023849.
Leung et al., Approximate quantum error correction can lead to better codes. Physical Review A. Oct. 1, 1997;56(4):2567-73.
Lidar et al., Decoherence-free subspaces for quantum computation. Physical Review Letters. Sep. 21, 1998;81(12):2594.
Lloyd et al., Analog quantum error correction. Physical Review Letters. May 4, 1998;80(18):4088-91.
Lloyd et al., Quantum computation over continuous variables. Phys. Rev. Lett. Feb. 22, 1999;82(8):1784-7.
Mabuchi et al., Inversion of quantum jumps in quantum optical systems under continuous observation. Physical review letters. Apr. 22, 1996;76(17):3108-11.
Marquardt et al., Optomechanics. Physics. 2009;2:40.
Marquardt et al., Quantum theory of cavity-assisted sideband cooling of mechanical motion. Physical review letters. Aug. 28, 2007;99(9):093902.
McKay et al., High-contrast qubit interactions using multimode cavity QED. Physical review letters. Feb. 27, 2015;114(8):080501.
Meier et al., Signatures of quantum phase transitions in the dynamic response of fluxonium qubit chains. Physical Review B. Aug. 24, 2015;92(6):064516.
Michael et al., New class of quantum error-correcting codes for a bosonic mode. Physical Review X. Jul. 14, 2016;6(3):031006.
Mirrahimi et al., Dynamically protected cat-qubits: a new paradigm for universal quantum computation. New Journal of Physics. Apr. 22, 2014;16(4):045014.
Morin et al., Shining light into black boxes. Science. Apr. 13, 2012;336(6078):159-60.
Motes et al., Encoding qubits into oscillators with atomic emsembles and squeezed light. Phys. Rev. A. May 8, 2017;95(5):053819.
Moussa et al., Demonstration of sufficient control for two rounds of quantum error correction in a solid state ensemble quantum information processor. Physical review letters. Oct. 10, 2011;107(16):160501.
Mundhada et al., Generating higher-order quantum dissipation from lower-order parametric processes. Quantum Science and Technology. May 24, 20174;2(2):024005.
Murch et al., Cavity-assisted quantum bath engineering. Physical review letters. Oct. 31, 2012;109(18):183602.
Nakamura et al., Coherent control of macroscopic quantum states in a single-Cooper-pair box. Nature. Apr. 1999;398(6730):786-8.
Nandkishore et al., Many-body localization and thermalization in quantum statistical mechanics. Annu. Rev. Condens. Matter Phys . . . Mar. 10, 2015;6(1):15-38.
Ng, Simple approach to approximate quantum error correction based on the transpose channel. Physical Review A. Jun. 28, 2010;81(6):062342.
Nielsen et al., Quantum Computation and Quantum Information. Cambridge Series on Information and the Natural Sciences; Cambridge University Press. First published Oct. 23, 2000; 10th anniversary edition published Dec. 9, 2010:1-676.
Nigg et al., Stabilizer quantum error correction toolbox for superconducting qubits. Physical Review Letters. Jun. 14, 2013;110(24):243604.
Nigg et al., Black-box superconducting circuit quantization. Physical Review Letters. Jun. 12, 2012;108(24):240502.
Nigg et al., Quantum computations on a topologically encoded qubit. Science. Jul. 18, 2014;345(6194):302-5.
Niset et al., Experimentally feasible quantum erasure-correcting code for continuous variables. Physical review letters. Sep. 26, 2008;101(13):130503.
Niset et al., No-go theorem for Gaussian quantum error correction. Phys. Rev. Lett. Mar. 24, 2009;102:120501.
Niu et al., Hardware-efficient bosonic quantum error-correcting codes based on symmetry operators. Phys. Rev. A. Mar. 27, 2018;97:032323.
Noh et al., Encoding an oscillator into many oscillators. Phys. Rev. Lett. Aug. 18, 2020;125:080503.
Noh et al., Fault-tolerant bosonic quantum error correction with the surface-Gottesman-Kitaev-Preskill code. Physical Review A. Jan. 13, 2020;101(1):012316.
Noh et al., Quantum capacity bounds of Gaussian thermal loss channels and achievable rates with Gottesman-Kitaev-Preskill codes. IEEE Transactions on Information Theory. Apr. 2019;65(4):2563-82.
Ofek et al., Demonstrating quantum error correction that extends the lifetime of quantum information. arXiv preprint arXiv: 1602.04768. Feb. 15, 2016, 44 pages.
Ofek et al., Extending the lifetime of a quantum bit with error correction in superconducting circuits. Nature. Aug. 2016;536(7617):441-5.
Paik et al., Observation of high coherence in Josephson junction qubits measured in a three-dimensional circuit QED architecture. Physical Review Letters. Dec. 5, 2011;107(24):240501.
Peng, Reproducible research in computational science. Science. Dec. 2, 2011;334(6060):1226-7.
Pirandola et al. Constructing finite-dimensional codes with optical continuous variables. Europhys. Lett. Oct. 1, 2004;68(323):0402202.
Pirandola et al. Generating continuous variable quantum codewords in the near-field atomic lithography. Journal of Physics B: Atomic, Molecular and Optical Physics. Feb. 1, 2006;39(4):997.
Plenio et al., Quantum error correction in the presence of spontaneous emission. Physical Review A. Jan. 1, 1997;55(1):67-71.
Reagor et al., Quantum memory with near-millisecond coherence in circuit QED. Phys Rev B. 2016;94:014506.
Reagor et al., Reaching 10 ms single photon lifetimes for superconducting aluminum cavities. Applied Physics Letters. May 13, 2013;102(19):192604.
Reed et al., Realization of three-qubit quantum error correction with superconducting circuits. Nature. Feb. 2012;482(7385):382-5.
Rigetti et al., Superconducting qubit in a waveguide cavity with a coherence time approaching 0.1 ms. Physical Review B. Sep. 24, 2012;86(10):100506.
Riste et al., Detecting bit-flip errors in a logical qubit using stabilizer measurements. Nature Communications. Apr. 29, 2015;6:6983.
Romero et al., Microwave photon detector in circuit QED. Physical review letters. Apr. 29, 2009;102(17):173602.
Royer et al. Stabilization of finite-energy Gottesman-Kitaev-Preskill states. Physical Review Letters. Dec. 31, 2020;125(26):260509.
Royer et al.. Encoding qubits in multimode grid states. PRX Quantum. Mar. 7, 2022;3(1):010335.
Sayrin et al., Real-time quantum feedback prepares and stabilizes photon number states. Nature. Sep. 2011;477(7362):73-7.
Schindler et al., Experimental repetitive quantum error correction. Science. May 27, 2011;332(6033):1059-61.
Schoelkopf et al., Wiring up quantum systems. Nature. Feb. 6, 2008;451(7179):664-9.
Schuster et al., Resolving photon number states in a superconducting circuit. Nature. Feb. 2007;445(7127):515-18.
Sete et al., Robust quantum state transfer using tunable couplers. Physical Review B. Apr. 22, 2015;91(14):144509.
Shankar et al., Autonomously stabilized entanglement between two superconducting quantum bits. Nature. Dec. 2013;504(7480):419.
Shor, Scheme for reducing decoherence in quantum computer memory. Physical review A. Oct. 1, 1995;52(4):R2493-6.

(56) References Cited

OTHER PUBLICATIONS

Silveri et al., New class of photonic quantum error correction codes. APS March Meeting 2016, Abstract ID K44.005, 1 page.
Silveri et al., Theory of remote entanglement via quantum-limited phase-preserving amplification. Physical Review A. Jun. 7, 2016;93(6):062310.
Smith et al., Many-body localization in a quantum simulator with programmable random disorder. Nature Physics. Oct. 2016;12(10):907-10.
Sparrow et al., Simulating the vibrational quantum dynamics of molecules using photonics. Nature. May 2018;557(7707):660-7.
Srinivasan et al., Time-reversal symmetrization of spontaneous emission for quantum state transfer. Physical Review A. Mar. 31, 2014;89(3):033857.
Srinivasan et al., Tunable coupling in circuit quantum electrodynamics using a superconducting charge qubit with a V-shaped energy level diagram. Physical review letters. Feb. 22, 2011;106(8):083601.
Steane, Error correcting codes in quantum theory. Physical Review Letters. Jul. 29, 1996;77(5):793-7.
Su et al., Conversion of Gaussian states to non-Gaussian states using photon-number-resolving detectors. Phys. Rev. A. Nov. 1, 2019; 100:052301.
Sun et al., Tracking photon jumps with repeated quantum non-demolition parity measurements. Nature. Jul. 2014;511(7510):444-8.
Sundaresan et al., Beyond strong coupling in a multimode cavity. Physical Review X. Jun. 29 2015;5(2):021035.
Taminiau et al., Universal control and error correction in multi-qubit spin registers in diamond. Nature nanotechnology. Mar. 2014;9(3):171-6.
Terhal et al., Encoding a qubit into a cavity mode in circuit QED using phase estimation. Physical Review A. Jan. 11, 2016;93(1):012315.
Terhal, Quantum error correction for quantum memories. Reviews of Modern Physics. Apr. 7, 2015;87(2):307-46.
Touzard et al., Coherent oscillations inside a quantum mani-fold stabilized by dissipation. Phys. Rev. X. Apr. 4, 2018; 8:021005 (7 pages).
Touzard et al., Grid states for encoding and stabilizing a logical qubit in superconducting circuits (Part 2). APS March Meeting Abstracts 2019. Mar. 7, 2019:S27-005, 1 page. https://meetings.aps.org/Meeting/MAR19/Session/S27.5.
Travaglione et al. Preparing encoded states in an oscillator. Phys. Rev. A. Nov. 22, 2002;66:052322.
Underwood et al., Measurement of the motional sidebands of a nanogram-scale oscillator in the quantum regime. Physical Review A. Dec. 2, 2015;92(6):061801.
Vasconcelos et al., All-optical generation of states for "encoding a qubit in an oscillator". Opt. Lett. Oct. 1, 2010;35(19):3261-3.
Vlastakis et al., Deterministically encoding quantum information using 100-photon Schrödinger cat states. Science. Nov. 1, 2013;342(6158):607-10.
Vlastakis et al., Violating Bell's inequality with an artificial atom and a cat state in a cavity. arXiv preprint arXiv: 1504.02512. Apr. 9, 2015.
Vuillot et al., Quantum Error Correction with the toric Gottesman-Kitaev-Preskill Code. Phys. Rev. A. Mar. 29, 2019;99:032344. arXiv:1810.00047v2 [quant-ph].
Waldherr et al., Quantum error correction in a solid-state hybrid spin register. Nature. Feb. 2014;506(7487):204-7.
Wang et al., A Schrödinger cat living in two boxes. Science. May 27, 2016;352(6289):1087-91.
Weedbrook et al., Gaussian quantum information. Rev. Mod. Phys. May 1, 2012;84:621-69.
Weigand et al., Generating Grid States From Schrödinger Cat States Without Postselection. Phys. Rev. A. Feb. 28, 2018;97:022341.
Wenner et al., Catching time-reversed microwave coherent state photons with 99.4% absorption efficiency. Physical Review Letters. May 28, 2014;112(21):210501.
Wilson-Rae et al., Theory of ground state cooling of a mechanical oscillator using dynamical backaction. Physical Review Letters. Aug. 28, 2007;99(9):093901.
Yin et al., Catch and release of microwave photon states. Physical review letters. Mar. 4, 2013;110(10):107001.
Yurke et al., SU (2) and SU (1, 1) interferometers. Physical Review A. Jun. 1, 1986;33(6):4033-54.
Yurke et al., The dynamic generation of Schrödinger cats and their detection. Physica B. Jul. 1, 1988;151(1-2):298-301.
Zanardi et al., Noiseless quantum codes. Physical Review Letters. Oct. 27, 1997;79(17):3306.
Zhang et al., Experimental implementation of encoded logical qubit operations in a perfect quantum error correcting code. Physical review letters. Sep. 6, 2012;109(10):100503.
Zheng et al., Demonstrating non-Abelian statistics of Majorana fermions using twist defects. Physical Review B. Dec. 31, 2015;92(24):245139.
Zueco et al., Qubit-oscillator dynamics in the dispersive regime: analytical theory beyond rotating-wave approximation. Physical Review A. 2009;80:033846.
Kitaev, Quantum error correction with imperfect gates. Quantum Communication, Computing, and Measurement. Jul. 1997;181-8.
Shapiro et al., Optical communication with two-photon coherent states-part II: Photoemissive detection and structured receiver performance. IEEE Transactions on Information Theory. Mar. 1979;25(2):179-92.
Zak, Finite translations in solid-state physics. Physical Review Letters. Dec. 11, 1967;19(24):1385.
PCT/US2016/064609, Jul. 31, 2017, International Search Report and Written Opinion.
PCT/US2016/064609, Jun. 14, 2018, International Preliminary Report on Patentability.
EP16892925.5, Jun. 28, 2019, Extended European Search Report.
PCT/US2019/012438, Aug. 12, 2019, International Search Report and Written Opinion.
PCT/US2019/012438, Jul. 16, 2020, International Preliminary Report on Patentability.
EP19756883.5, Aug. 6, 2021, Extended European Search Report.
PCT/US2020/025204, Jun. 23, 2020, International Search Report and Written Opinion.
PCT/US2020/025204, Oct. 7, 2021, International Preliminiary Report on Patentability.
EP20776963.9, Nov. 25, 2022, Extended European Search Report.
PCT/US2022/053675, Apr. 6, 2023, International Search Report and Written Opinion.

\* cited by examiner

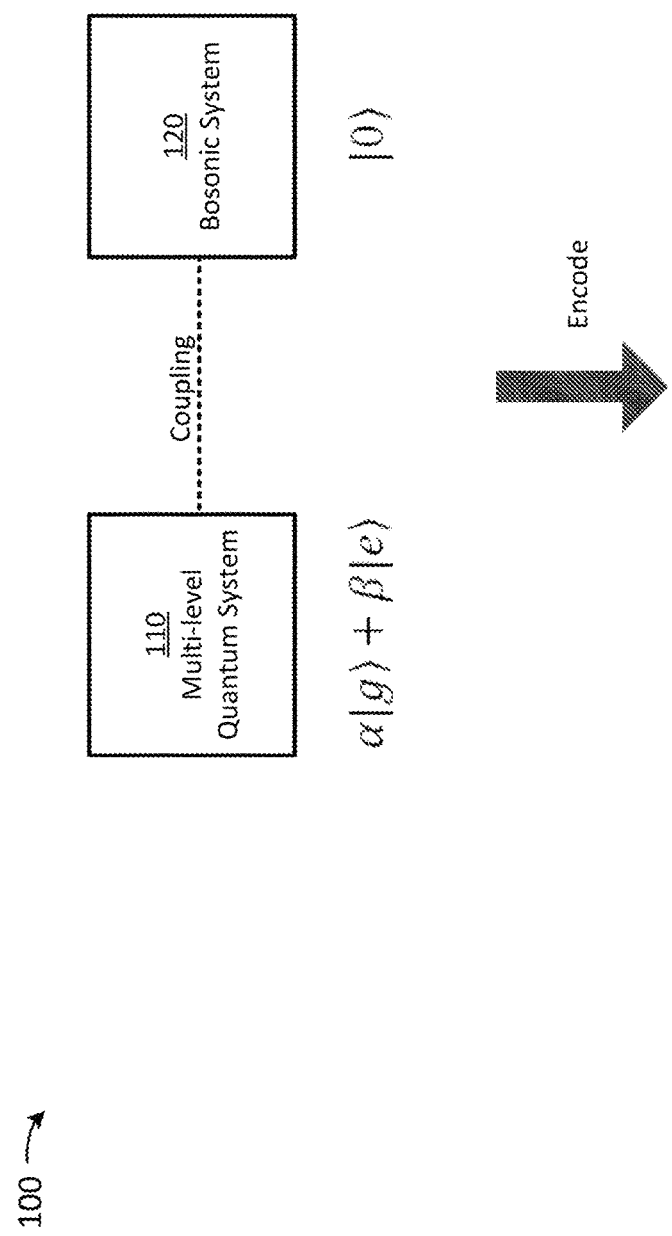

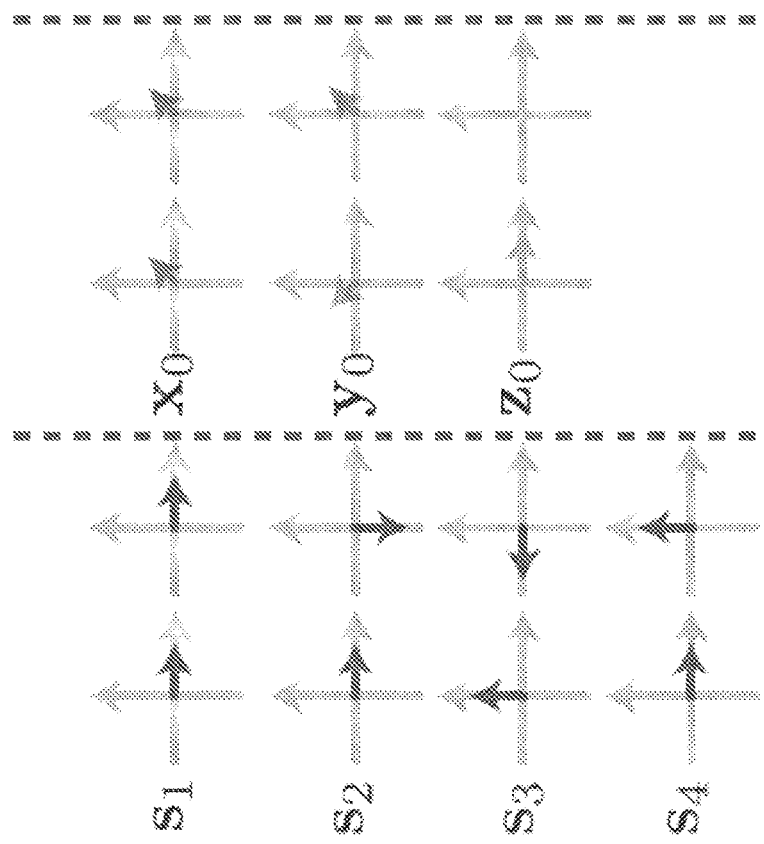
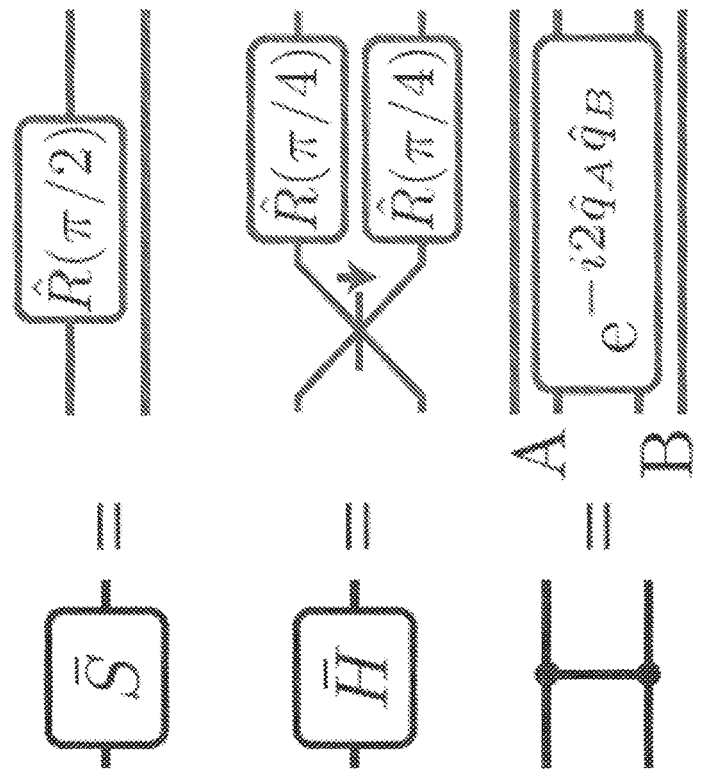
FIG. 8A
FIG. 8B
FIG. 8C
FIG. 8D
FIG. 8E

TECHNIQUES FOR QUANTUM ERROR CORRECTION USING MULTIMODE GRID STATES AND RELATED SYSTEMS AND METHODS

RELATED APPLICATIONS

This application is a national stage filing under 35 U.S.C. § 371 of International Patent Application Serial No. PCT/US2022/053675, filed Dec. 21, 2022, entitled "TECHNIQUES FOR QUANTUM ERROR CORRECTION USING MULTIMODE GRID STATES AND RELATED SYSTEMS AND METHODS," which claims the benefit of U.S. Provisional Patent Application Ser. No. 63/292,608, filed Dec. 22, 2021, entitled "TECHNIQUES FOR QUANTUM ERROR CORRECTION USING MULTIMODE GRID STATES AND RELATED SYSTEMS AND METHODS," each of which is incorporated herein by reference in its entirety.

GOVERNMENT FUNDING

This invention was made with government support under W911NF-18-1-0212 awarded by United States Army Research Office. The government has certain rights in the invention.

BACKGROUND

Quantum information processing techniques perform computations by manipulating one or more quantum objects. These techniques are sometimes referred to as "quantum computing." In order to perform computations, a quantum information processor utilizes quantum objects to reliably store and retrieve information. According to some quantum information processing approaches, a quantum analogue to the classical computing "bit" (being equal to 1 or 0) has been developed, which is referred to as a quantum bit, or "qubit." A qubit can be composed of any quantum system that has two distinct states (which may be thought of as 1 and 0 states), but also has the special property that the system can be placed into quantum superpositions and thereby exist in both of those states at once.

Several different types of qubits have been successfully demonstrated in the laboratory. However, the lifetime of the states of many of these systems before information is lost due to decoherence of the quantum state, or to other quantum noise, is currently around ~100 μs for superconducting qubits. Notwithstanding longer lifetimes, it may be important to provide error correction techniques in quantum computing that enable reliable storage and retrieval of information stored in a quantum system. However, unlike a classical computing system in which bits can be copied for purposes of error correction, it is not possible to clone an unknown state of a quantum system. The system may, however, be entangled with other quantum systems which effectively spreads the information in the system out over several entangled objects.

SUMMARY

A method of operating a circuit quantum electrodynamics system that includes an ancilla qubit dispersively coupled to a multimode bosonic system having a plurality of modes and operating as a logical qubit, the method comprising repeatedly performing a sequence of operations that autonomously detect and correct quantum errors arising in the state of the ancilla qubit and/or in the state of the logical qubit, the sequence of operations comprising applying a first drive waveform to each of the plurality of modes of the multimode bosonic system, wherein the first drive waveform changes the state of the ancilla qubit dependent on whether an error has occurred in the state of the ancilla qubit and/or in the state of the logical qubit, subsequent to applying the first drive waveform, applying a second drive waveform to the ancilla qubit, and subsequent to applying the second drive waveform, applying a third drive waveform to each of the plurality of modes of the multimode bosonic system, wherein the third drive waveform corrects the error that occurred in the state of the ancilla qubit and/or in the state of the logical qubit.

According to some embodiments, the sequence of operations further comprises applying a fourth drive waveform to each of the plurality of modes of the multimode bosonic system, wherein the fourth drive waveform changes the state of the ancilla qubit dependent on whether an error has occurred in the state of the ancilla qubit, subsequent to applying the fourth drive waveform, applying a fifth drive waveform to the ancilla qubit.

According to some embodiments, the sequence of operations further comprises applying a sixth drive waveform to the ancilla qubit to drive the ancilla qubit into an excited state.

According to some embodiments, the multimode bosonic system comprises a plurality of distinct bosonic systems each having one or more modes.

According to some embodiments, the multimode bosonic system comprises a single bosonic system having a plurality of modes.

According to some embodiments, the ancilla qubit is a transmon qubit.

According to some embodiments, the multimode bosonic system comprises two microwave cavities coupled to the ancilla qubit.

According to some embodiments, the sequence of operations autonomously detect and correct quantum errors arising in the state of the ancilla qubit, and the first drive waveform changes the state of the ancilla qubit dependent on whether an error has occurred in the state of the logical qubit.

According to some embodiments, the method further comprises performing a plurality of quantum gates on a logical state of the logical qubit.

According to some embodiments, the plurality of quantum gates are performed interleaved with instances of the sequence of operations, such that the method comprises at least performing a first quantum gate, followed by performing the sequence the operations a first time, followed by performing a second quantum gate, followed by performing the sequence of operations a second time.

According to some embodiments, the first drive waveform changes the state of the ancilla qubit by imparting a change of phase to the state of the ancilla qubit.

According to some embodiments, the first drive waveform further changes the state of one or more modes of the multimode bosonic system.

A system, comprising a circuit quantum electrodynamics system that includes an ancilla qubit dispersively coupled to a multimode bosonic system having a plurality of modes and operating as a logical qubit, at least one computer readable medium storing a plurality of drive waveforms, at least one controller configured to apply a first drive waveform of the plurality of waveforms to each of the plurality of modes of the multimode bosonic system, wherein the first drive waveform changes the state of the ancilla qubit dependent on whether an error has occurred in the state of the ancilla qubit, subsequent to applying the first drive waveform, apply a second drive waveform of the plurality of waveforms to the ancilla qubit, and subsequent to applying the second drive waveform, apply a third drive waveform of the plurality of waveforms to each of the plurality of modes of the multimode bosonic system, wherein the third drive waveform corrects the error that occurred in the state of the ancilla qubit.

According to some embodiments, the multimode bosonic system comprises a plurality of distinct bosonic systems each having one or more modes.

According to some embodiments, the multimode bosonic system comprises a single bosonic system having a plurality of modes.

According to some embodiments, the ancilla qubit is a transmon qubit.

According to some embodiments, the multimode bosonic system comprises two microwave cavities coupled to the ancilla qubit.

According to some embodiments, the at least one controller is further configured to apply a fourth drive waveform to each of the plurality of modes of the multimode bosonic system, wherein the fourth drive waveform changes the state of the ancilla qubit dependent on whether an error has occurred in the state of the ancilla qubit, subsequent to applying the fourth drive waveform, apply a fifth drive waveform to the ancilla qubit.

According to some embodiments, the at least one controller is further configured to apply a sixth drive waveform to the ancilla qubit to drive the ancilla qubit into an excited state.

According to some embodiments, the first drive waveform changes the state of the ancilla qubit by imparting a change of phase to the state of the ancilla qubit.

The foregoing apparatus and method embodiments may be implemented with any suitable combination of aspects, features, and acts described above or in further detail below. These and other aspects, embodiments, and features of the present teachings can be more fully understood from the following description in conjunction with the accompanying drawings.

BRIEF DESCRIPTION OF DRAWINGS

Various aspects and embodiments will be described with reference to the following figures. It should be appreciated that the figures are not necessarily drawn to scale. In the drawings, each identical or nearly identical component that is illustrated in various figures is represented by a like numeral. For purposes of clarity, not every component may be labeled in every drawing.

FIGS. 1A-1B depict a process of encoding a logical quantum state in a bosonic system, according to some embodiments;

FIGS. 8A-8E depict aspects of a $D_4$ grid code, according to some embodiments;

DETAILED DESCRIPTION

Figure 2A:
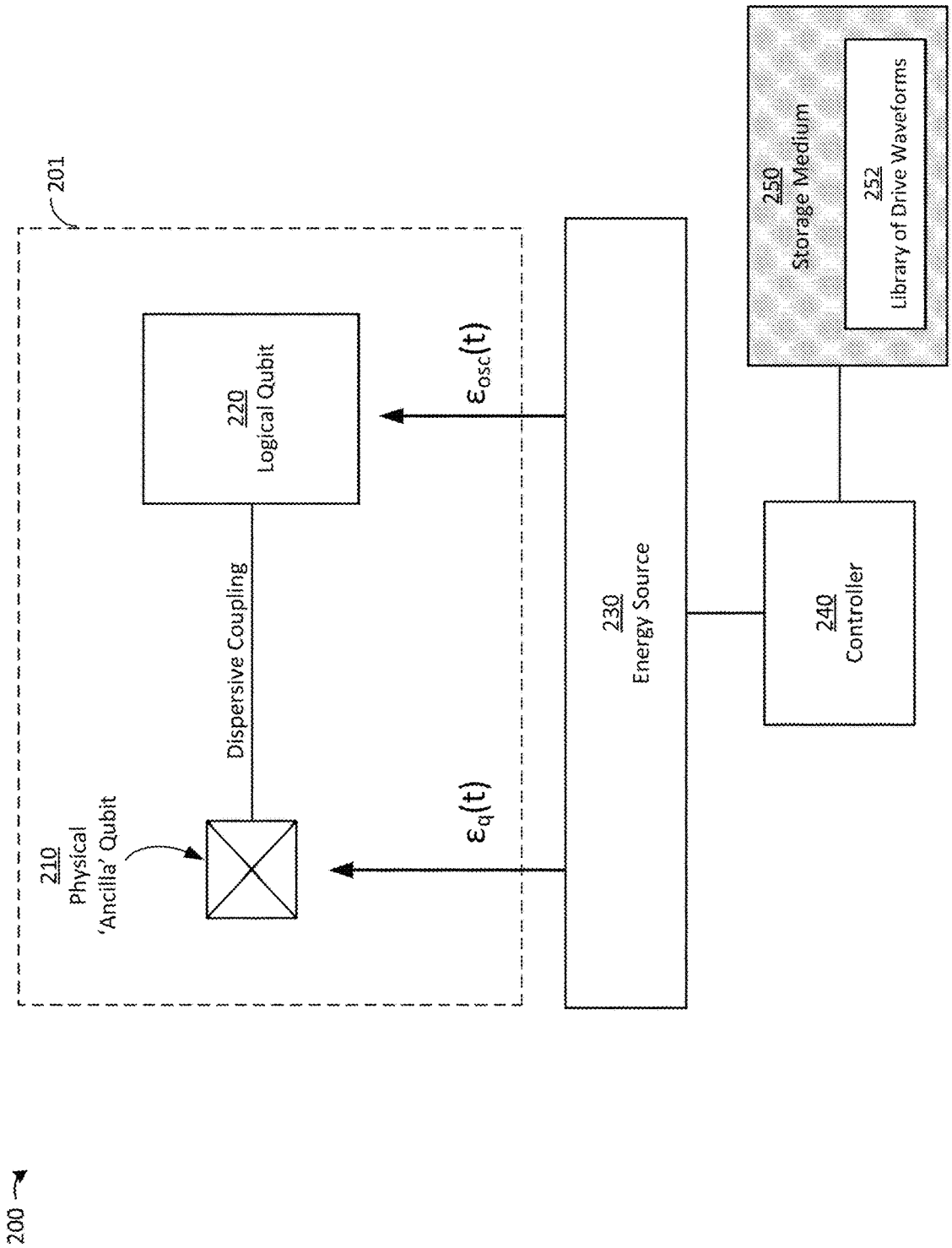
FIG. 2A depicts an illustrative system suitable for practicing aspects of the present application, according to some embodiments.

The present application relates to an improved quantum error correction technique for correcting errors in the state of a quantum system exhibiting one or more bosonic modes. An "error" in this context refers to a change in the state of the quantum system that may be caused by, for instance, boson losses, boson gains, dephasing, etc., and which alters the state of the system such that the information stored in the system can be altered.

As described above, quantum multi-level systems exhibit quantum states that, based on current experimental practices, decohere in short time periods (e.g., around ~100 µs in superconducting qubits). While experimental techniques will undoubtedly improve on this and produce qubits with longer coherence times, it is nonetheless beneficial to store quantum information in another system that exhibits much longer coherence times. As will be described below, bosonic modes are particularly desirable for storing quantum information and thereby functioning as a 'logical' qubit. A logical qubit state may be represented by bosonic mode(s), thereby maintaining the same information yet in a longer-lived state than would otherwise exist in the physical multi-level system alone.

Quantum information stored in bosonic modes may nonetheless still have a limited lifetime, such that errors will still occur within the bosonic system. It may therefore be desirable to arrange a bosonic system to be robust against errors and/or to configure the bosonic system so that, when errors occur, the bosonic system can be driven to effectively correct those errors and regain the prior state of the system. If a broad class of errors can be corrected for, it may be possible to extend the coherence time of the bosonic system for long periods of time (and potentially indefinitely) by correcting for any type of error that might occur.

The fields of cavity quantum electrodynamics (cavity QED) and circuit QED represent one illustrative experimental approach to implement quantum error correction. In these approaches, a logical qubit state is mapped onto states of a resonator cavity. The resonator generally will have a longer stable lifetime than a physical qubit. If desired, the quantum state may later be retrieved in a physical qubit by mapping the state back from the resonator to the qubit.

When a multi-level system, such as a qubit, is mapped onto the state of a bosonic system to which it is coupled, a particular way to encode the qubit state in the bosonic states must be selected. This choice of encoding is often referred to as a "bosonic code," or simply a "code." As an example, a code might represent the ground state of a qubit using the zero boson number state of a resonator and represent the excited state of a qubit using the one boson number state of the resonator. That is:

$$(\alpha|g\rangle + \beta|e\rangle) \otimes |0\rangle \to |g\rangle \otimes (\alpha|0\rangle + \beta|1\rangle)$$

where $|g\rangle$ is the ground state of the qubit, $|e\rangle$ is the excited state of the qubit, $\alpha$ and $\beta$ are complex numbers representing the probability amplitude of the qubit being in state $|g\rangle$ or $|e\rangle$, respectively, and $|0\rangle$ and $|1\rangle$ are the zero boson number state and one boson number state of the resonator, respectively. While this is a perfectly valid code, it fails to be robust against many errors, such as boson loss. That is, when a boson loss occurs, the state of the resonator prior to the boson loss may be unrecoverable with this code.

The use of a code can be written more generally as:

$$(\alpha|g\rangle + \beta|e\rangle) \otimes |0\rangle \to |g\rangle \otimes (\alpha|W_\downarrow\rangle + \beta|W_\uparrow\rangle) \quad \text{(Eqn. 1)}$$

where $|W\downarrow\rangle$ and $|W\uparrow\rangle$ are referred to as the logical code words (or simply "code words"). The choice of a code—equivalently, the choice of how to encode the state of a two-level system (e.g., a qubit) in the state of the bosonic system—therefore includes choosing values for $|W\downarrow\rangle$ and $|W\downarrow\rangle$. FIGS. 1A-1B graphically depict this process of encoding for some choice of $|W\downarrow\rangle$ and $|W\uparrow\rangle$.

When an error occurs, the system's state transforms to a superposition of resulting states, herein termed "error words," $|E\downarrow^k\rangle$ and $|E\uparrow^k\rangle$ as follows:

$$\alpha|W_\downarrow\rangle + \beta|W_\uparrow\rangle \to \alpha|E_\downarrow^k\rangle + \beta|E_\uparrow^k\rangle \quad \text{(Eqn. 2)}$$

where the index k refers to a particular error that has occurred. As described above, examples of errors include boson loss, boson gain, dephasing, etc. In general, the choice of code affects how robust the system is to errors. That is, the code used determines to what extent a prior state can be faithfully recovered when an error occurs. A desirable code would be associated with a broad class of errors for which no information is lost when any of the errors occurs and any quantum superposition of the logical code words can be faithfully recovered.

One challenge with the above-described approach is that codes may be limited by the lifetime of a non-linear ancilla required for quantum control of the bosonic system. Typically the bosonic system is controlled, and errors in the bosonic system are corrected, through manipulation of an ancilla qubit that is coupled to the bosonic system. This may mean, however, that when an error occurs in the ancilla qubit, error correction of the state of the bosonic system may not longer be possible. While some attempts have been made to correct errors in ancilla qubits, some may require modification of the ancilla qubit, which is undesirable.

The inventors have recognized and appreciated a class of multimode codes that protect against errors within an ancilla qubit coupled to a bosonic system, and that can be realized experimentally. In these multimode codes, a logical qubit state is represented by the states of multiple different modes of one or more bosonic systems, which may include multiple modes of a single bosonic system and/or single modes from multiple bosonic systems. As such, irrespective of how the multimode system is practically implemented, a single logical qubit may be represented by the ensemble of bosonic modes. The inventors have further developed techniques for correcting errors when a multimode code is utilized to store a logical state in a multimode bosonic system. In particular, the inventors have developed a series of operations that autonomously detect and correct errors in the ancilla qubit by repeatedly cycling through a sequence of operations that are applied to the multiple bosonic modes and/or to an ancilla qubit that is coupled to each of the bosonic modes. The codes described herein allow ancilla errors to propagate to the modes of the bosonic system as correctable errors, where they can be corrected, instead of presenting as logical errors in the ancilla qubit.

According to some embodiments, the multimode codes described herein may be used to configure a state of a multimode bosonic system. Bosonic systems may be particularly desirable systems in which to apply the techniques described herein, as a single bosonic mode may exhibit equidistant spacing of coherent states. A resonator cavity, for example, is a simple harmonic oscillator with equidistant level spacing of bosonic modes. Bosonic modes are also helpful for quantum communications in that they can be stationary for quantum memories or for interacting with conventional qubits, or they can be propagating ("flying") for quantum communication (e.g., they can be captured and released from resonators).

According to some embodiments, autonomous correction of errors in the ancilla qubit and/or in the multimode bosonic system may comprise repeating the same sequence of operations, wherein each operation applies a drive to either the modes of the multimode bosonic system, or to the ancilla qubit that is coupled to each of the modes of the multimode bosonic system. In some embodiments, the sequence of operations may comprise one or more drives applied to the modes of the multimode bosonic system that alter the state of the multimode bosonic system based on the state of the ancilla qubit ('measurement drives') and one or more drives applied to modes of the multimode bosonic system that correct errors in the ancilla qubit and/or the multimode state based on the state of the ancilla qubit. In some embodiments, the sequence of operations may comprise one or more drives applied to the ancilla qubit. In some embodiments, the sequence of operations may comprise: (1) a first drive (e.g., displacement drive) applied to the modes of the multimode bosonic system that alters the state of the multimode bosonic system based on the ancilla qubit state; (2) a first drive applied to the ancilla qubit; (3) a second drive (e.g., displacement drive) applied to the modes of the multimode bosonic system that alters the state of the multimode bosonic system based on the ancilla qubit state; (4) a second drive applied to the ancilla qubit; and (5) a drive (e.g., displacement drive) applied to the modes of the multimode bosonic system that corrects one or more errors in the ancilla qubit and/or the multimode state based on the state of the ancilla qubit. In some embodiments, a subsequent drive (6) may be applied to the ancilla qubit to set its state to the ground state, or to the excited state. In some embodiments, the above sequence operations may be preceded by application of an initialization drive to the ancilla qubit to set its state to the ground state, or to the excited state, or to a superposition of the ground and excited states.

According to some embodiments, autonomous correction of errors in the ancilla qubit and/or the multimode bosonic system may comprise repeating the drives (1)-(6) described above a number of times equal to twice the number of modes (2m) in the multimode bosonic system, wherein each of the m iterations of the drives (1)-(6) applies different drives to the modes of the multimode bosonic system in (1), (3) and (5). For example, a two mode multimode system may be controlled to autonomously correct errors by repeatedly performing a sequence of 24 drives with one sequence being performed after the previous sequence. Each of the drives (1)-(6) in each repetition of this sequence may be based on a different vector in phase space that defines the direction and length of displacement drives in (1), (3) and (5). The drives are derived from vectors $s_1, s_2, s_3, \ldots s_{2m}$ described herein. As such, the first iteration of the sequence of the drives (1)-(6) may be based on a first vector $s_1$, a second iteration based on a second vector $s_2$, etc. through to the final iteration based on a vector $s_{2m}$. Following this iteration, the entire sequence may then be repeated beginning with the first iteration again.

FIG. 2A depicts an illustrative system suitable for practicing aspects of the present application. In system 200, ancilla qubit 210 is coupled to a logical qubit 220 via dispersive coupling 215. Energy source 230 may supply energy to one or both of qubit 210 and logical qubit 220 in order to perform operations on the system such an encoding the state of the ancilla qubit 210 in the logical qubit 220, encoding the state of the logical qubit in the ancilla qubit, applying unitary operations to the logical qubit (e.g., to correct an error detected in the ancilla qubit and/or logical qubit), applying unitary operations to the ancilla qubit, or combinations thereof. In particular, an electromagnetic signal $\varepsilon_q(t)$ may be applied to the physical qubit 210 and/or an electromagnetic signal $\varepsilon_{osc}(t)$ may be applied to the logical qubit 220.

Figure 2B:
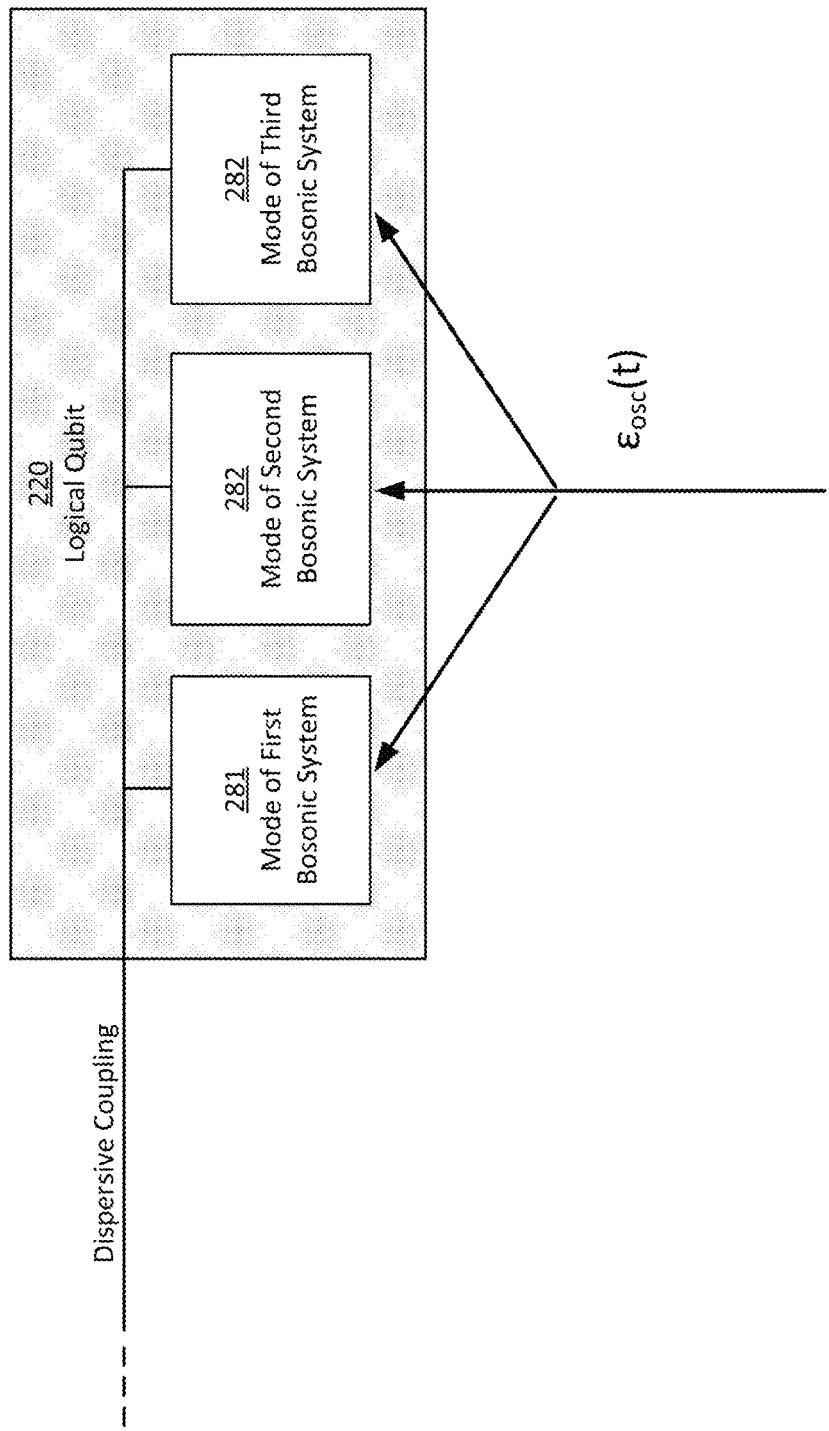
FIGS. 2B-2C depict different implementations of a logical qubit that is a multimode bosonic system, according to some embodiments.
Figure 2C:
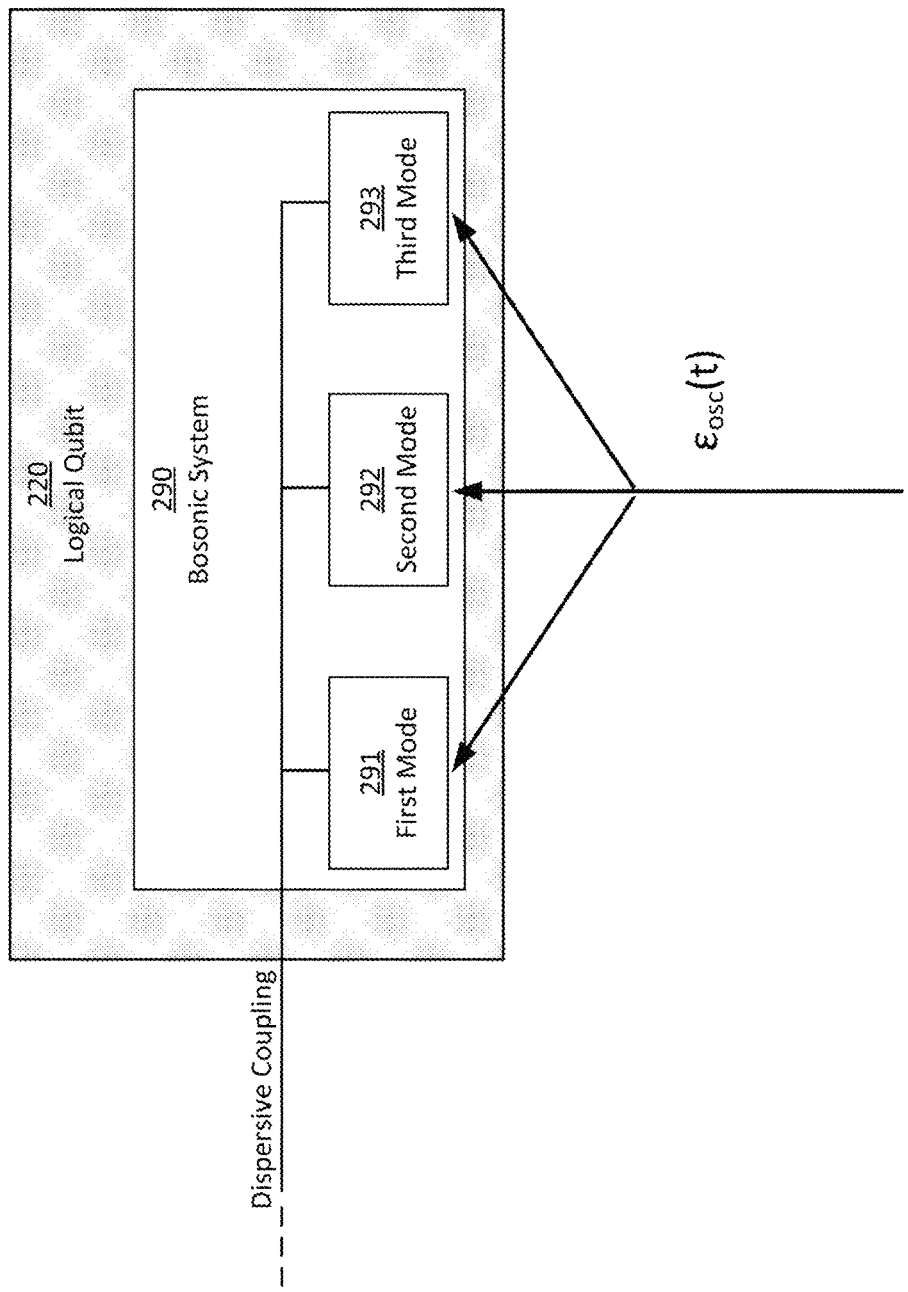

According to some embodiments, logical qubit 220 may be implemented as any suitable multimode bosonic system. While this may include photonic systems such as one or more microwave cavities, the techniques described herein are not limited to such systems. Logical qubit 220 may be implemented as a multimode bosonic system, which may include any combination of multiple modes of a single bosonic system and/or single modes of multiple bosonic systems. Examples are provided in FIGS. 2B and 2C, which show different implementations of logical qubit 220. In the example of FIG. 2B, the logical qubit is implemented as the ensemble of modes of three different bosonic systems. It may be noted that the drive $\varepsilon_{osc}(t)$ is applied to each of the different modes at the same time. In the description above, where drives are described as being applied to modes of a multimode bosonic system it will be appreciated that this involves simultaneously applying a drive to all of the modes. This system of driving the modes may be distinct from a case in which multiple modes are separately driven and are treated as distinct logical qubits (e.g., in so-called concatenated codes). In the example of FIG. 2C, the logical qubit 220 is implemented as three different modes of a single bosonic system 290.

Returning to FIG. 2A, qubit 210 may include any suitable quantum system having at least two distinct states, such as but not limited to, those based on a superconducting Josephson junction such as a charge qubit (Cooper-pair box), flux qubit or phase qubit, transmon qubit, or combinations thereof. The ancilla qubit 210 may be coupled to the logical qubit 220 via dispersive coupling 215 which couples the state of the ancilla qubit to the state of the logical qubit. The logical qubit 220 may include any bosonic system supporting a plurality of bosonic modes, which may be implemented using any electromagnetic, mechanical, magnetic (e.g., quantized spin waves also known as magnons), and/or other techniques, such as but not limited to any cavity resonator (e.g., a microwave cavity). According to some embodiments, logical qubit 220 may comprise a plurality of transmission line resonators.

In the example of FIG. 2A, the ancilla qubit and logical qubit are dispersively coupled—that is, the ancilla qubit to logical qubit detuning is much larger (e.g., an order of magnitude larger) than the coupling strength between the ancilla qubit and the logical qubit.

System 200 includes system 201 (which comprises the ancilla qubit 210 and logical qubit 220) in addition to energy source 230, controller 240 and storage medium 250. In some embodiments, a library of precomputed drive waveforms may be stored on a computer readable storage medium and accessed in order to apply said waveforms to a quantum system. In the example of FIG. 2A, controller 240 accesses drive waveforms 252 stored on storage medium 250 (e.g., in response to user input provided to the controller) and controls the energy source 230 to apply drive waveforms $\varepsilon_q(t)$ and $\varepsilon_{osc}(t)$ to the ancilla qubit and logical qubit, respectively. In some cases, system 200 may comprise multiple instances of system 201, each of which may be driven by the same energy source, which is coupled to the same controller and storage medium. As such, a plurality of ancilla qubit and logical qubit pairings may be simultaneously driven and controlled by the elements 230, 240 and 250.

As used herein, application of such an electromagnetic signal or pulse may also be referred to as "driving" of the ancilla qubit and/or the logical qubit. Coupling 215 may utilize any technique(s) to couple the ancilla qubit and the logical qubit, such as by coupling electric and/or magnetic fields generated by the ancilla qubit and the logical qubit. According to some embodiments, the ancilla qubit (e.g., a transmon) may be coupled to the logical qubit, being a mechanical resonator, via a piezoelectric coupling. According to some embodiments, the ancilla qubit may be coupled to the logical qubit, being a magnetic resonator, by coupling the ancilla qubit (e.g., a transmon) to phonons, which in turn couple to magnons via magnetostrictive coupling.

While examples of a superconducting qubits have been provided herein, it will be appreciated that the techniques described herein may be applied to other suitable systems, including but not limited to trapped ion qubits. For instance, electronic levels of trapped ions may be used as an ancilla qubit.

In general, system 200 may be operated so that a sequence of drives $\varepsilon_q(t)$ and $\varepsilon_{osc}(t)$ are applied to the ancilla qubit and logical qubit in an error correction sequence. In each step of the error correction sequence, either or both of the drives may be operated. The sequence of drives may be selected based on the particular code being used to store the logical state of the logical qubit. Examples of suitable codes and illustrative error correction sequences are described below.

According to some embodiments, drives $\varepsilon_q(t)$ and/or $\varepsilon_{osc}(t)$ may be applied to the ancilla qubit and logical qubit to perform one or more operations that alter the logical state of the logical qubit. These operations may include, for example, state preparation, logical gates, readout operations, etc. Gate operations may include single qubit gates, as well as multiple-qubit gates in which multiple instances of the logical qubit and ancilla qubit elements are driven. Error correction sequences may, in some embodiments, be performed interleaved with such operations. For instance, system 201 may be driven to prepare a state, then an error correction sequence performed, then a single qubit gate may be applied to the system, then the error correction sequence may be performed, etc.

Figure 3:
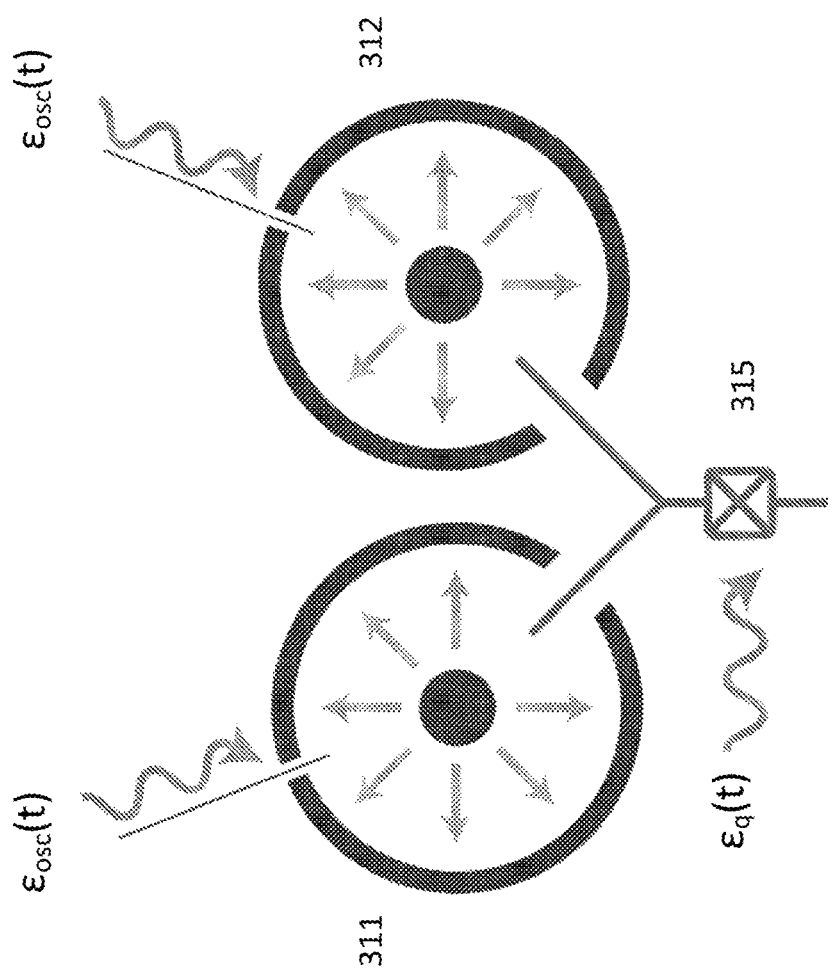
FIG. 3 depicts an illustrative system that comprises a transmon ancilla qubit and a pair of resonator cavities, according to some embodiments.

FIG. 3 depicts an illustrative implementation of system 201 that comprises a transmon ancilla qubit and a pair of resonator cavities, according to some embodiments. In the example of FIG. 3, resonator cavities (e.g., microwave cavities) 311 and 312 are both dispersively coupled to a transmon qubit 315, which acts as an ancilla qubit. The resonator cavities 311 and 312 are operated as a single logical qubit using the resonator mode of the first resonator cavity 311 and the resonator mode of the second resonator cavity 312 as multiple modes for purposes of storing logical quantum information. For instance, the system of FIG. 3 is an example of using two bosonic systems as a logical qubit as shown in FIG. 2B (albeit with two bosonic systems instead of the three shown in FIG. 2B). In the example of FIG. 3, electromagnetic modes of the resonator cavities and the transmon qubit may be controlled by drives $\varepsilon_q(t)$ and/or $\varepsilon_{osc}(t)$.

Prior to describing the various multimode codes that may be employed as described herein, the notation and conventions that will be followed herein are first described. In the following, m harmonic oscillator (resonator) modes are considered to establish correspondences between translations in a (symplectic) vector space $\mathbb{R}^{2m}$ and the quantum Hilbert space of these m modes. The dimensionless creation and annihilation operators for the jth mode are denoted $\hat{a}_j$ and $\hat{a}_j^\dagger$, respectively, obeying $[\hat{a}_j, \hat{a}_k^\dagger]=\delta_{jk}$. The below assumes units of $\hbar=1$ and denotes the quadrature coordinates $\hat{q}_j=(\hat{a}_j+\hat{a}_j^\dagger)/\sqrt{2}$ and $\hat{p}_j=-i(\hat{a}_j-\hat{a}_j^\dagger)/\sqrt{2}$ such that $[\hat{q}_j,\hat{p}_k]=i\delta_{jk}$. The quadrature coordinates are arranged in vectors such that $\hat{x}=(\hat{q}_1, \hat{p}_1, \hat{q}_2, \ldots, \hat{q}_M, \hat{p}_m)$, and points in phase space correspond to vectors $v \in \mathbb{R}^{2m}$ arranged in the same order as $\hat{x}$. All quantum operators are decorated with a hat and vectors are denoted by bold font.

A translation in phase space of the bosonic modes in defined by $v$ in units of $l=\sqrt{2\pi}$ as $$T(v) \equiv e^{-il\hat{x}^T \Omega v} = \bigotimes_{j=1}^{m} \hat{D}_j(l[Cv]_j),$$

where $\hat{D}_j(\alpha)=\exp\{\alpha \hat{a}_j^\dagger - \alpha^* \hat{a}_j\}$ with $\alpha \in \mathbb{C}$ is the standard displacement operator for the jth mode and C is a m×2m matrix that maps the real vector $v \in \mathbb{R}^{2m}$ to a complex vector $Cv \in \mathbb{C}^m$, $$C = \frac{1}{\sqrt{2}} \begin{pmatrix} 1 & i & 0 & 0 & \ldots \\ 0 & 0 & 1 & i & \ldots \\ & & \ldots & & \end{pmatrix}.$$

The anti-symmetric matrix $$\Omega = \bigoplus_{m} \begin{pmatrix} 0 & 1 \\ -1 & 0 \end{pmatrix},$$

is also defined, from which the symplectic form $$\omega(u,v)=u^T \Omega v.$$

is defined. This form is alternating, $\omega(u,v)=-\omega(v,u)$, which implies that $\omega(u,u)=0$. The commutation relations of the quadrature coordinates impose that $$\hat{T}(u)\hat{T}(v) = \hat{T}(v)\hat{T}(u)e^{i2\pi v^T \Omega u} = \hat{T}(u+v)e^{i\pi v^T \Omega u}.$$

By defining translations in units of $l=\sqrt{2\pi}$, the translation operators associated with two vectors u and v commute if and only if their symplectic form is an integer, $[\hat{T}(u),\hat{T}(v)]=0 \Leftrightarrow u^T \Omega v \in \mathbb{Z}$.

Define a rotation of the jth bosonic mode $$\hat{R}_j(\theta) = e^{-i\theta \hat{n}_j},$$

with $\hat{n}_j=\hat{a}_j^\dagger \hat{a}_j$, and its associated symplectic representation $$R(\theta) = \begin{pmatrix} \cos\theta & -\sin\theta \\ \sin\theta & \cos\theta \end{pmatrix},$$

with $\hat{R}(\theta)=\hat{Q}[R(\theta)]$. Moreover, also define a beamsplitter operation between two modes j, k, $\hat{B}_{j \to k}=\exp\{-i\pi(\hat{q}_j \hat{p}_k - \hat{p}_j \hat{q}_k)/4\}$ which has a symplectic representation $$B_{j \to k} = \frac{1}{\sqrt{2}} \begin{pmatrix} 1 & 0 & -1 & 0 \\ 0 & 1 & 0 & -1 \\ 1 & 0 & 1 & 0 \\ 0 & 1 & 0 & 1 \end{pmatrix}.$$

The arrow in the graphical representation of the beamsplitter operation matches the direction of the j→k arrow.

Finally, denote logical operations acting on encoded qubits with an overhead bar, $\overline{G}$, and denote the corresponding multimode unitary as $\hat{U}(\overline{G})$. As is usual for error-correcting codes, logical gates can have multiple equivalent representatives, and as a result the mapping $\hat{U}(\overline{G})$ is not unique. The representative referred to with the mapping $\hat{U}$ will be clear from the context.

The translations $\hat{T}(v)$ and rotations $\hat{R}_j(\theta)$ described above play a central role in quantum error correction of the multi-dimensional grid states, as described below. Initially, however, the states themselves are described below.

General Theory of Multi-Dimensional Grid States

According to some embodiments, the techniques described herein may encode a logical qubit in translation-invariant grid states, described below. In some cases, a logical qudit may be encoded in such state (a qudit is a quantum digit, and may have 2 or more values; a qubit is an example of a qudit with 2 values). Taking m oscillator modes, a Quantum Error Correction (QEC) code may be associated with a (classical) lattice $\Lambda$ in 2m dimensions, each mode contributing two quadrature coordinates, $\hat{q}$ and $\hat{p}$. The lattice $\Lambda$ is generated by a set of 2m linearly independent translations $\{s_j\}$, which can be arranged in a 2m×2m matrix S where each row corresponds to one basis vector $s_j$, $$S = \begin{pmatrix} s_1 \\ s_2 \\ \ldots \\ s_{2m} \end{pmatrix}.$$

The lattice points are then given by $$\Lambda = \{S^T a | a \in \mathbb{Z}^{2m}\}.$$

Figure 4:
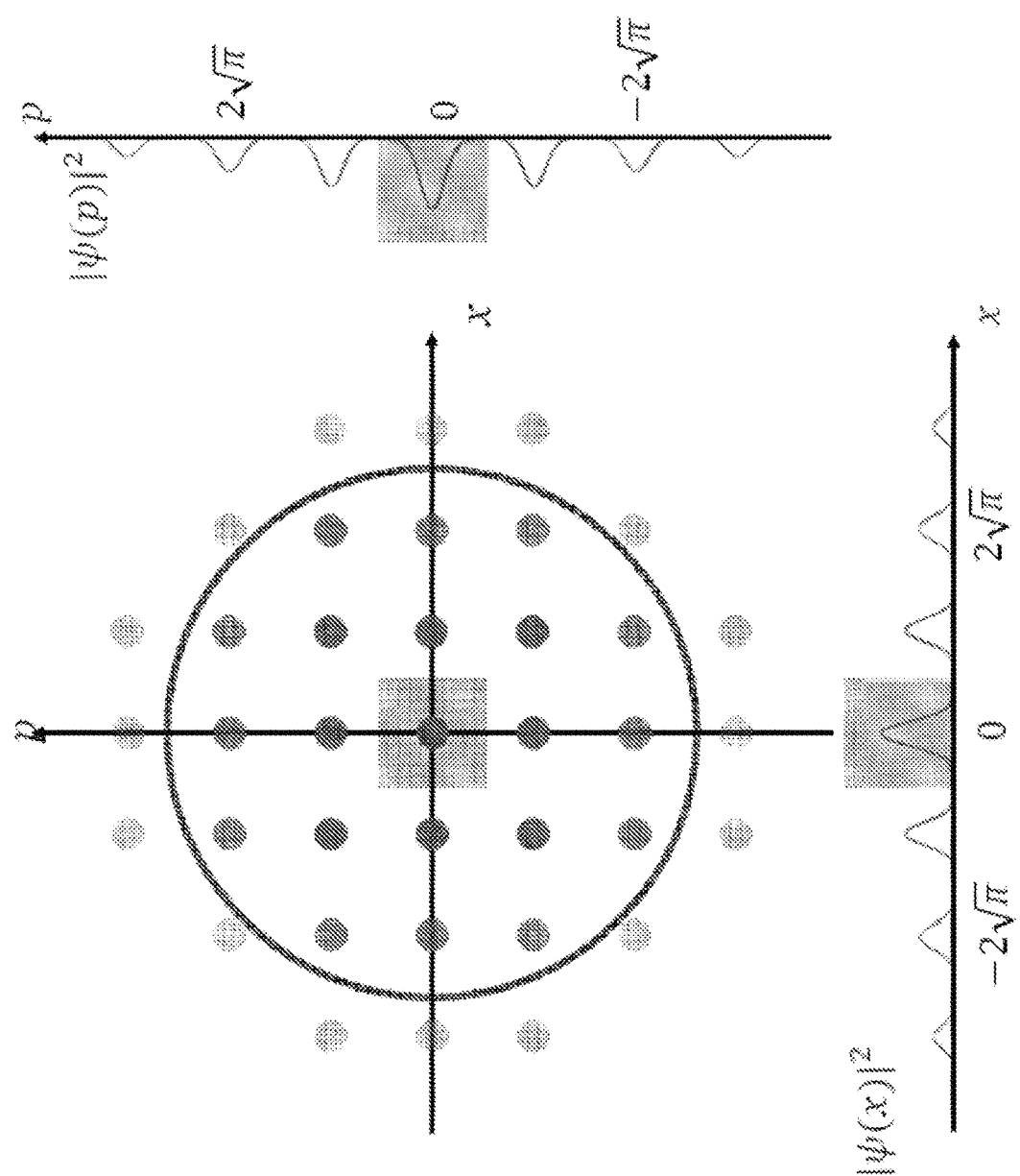
FIG. 4 depicts a lattice of QEC grid states, according to some embodiments.

An example of a lattice is shown in FIG. 4, which depicts lattice points in phase space (the diagram is labeled in terms of x and p as coordinates, rather than $\hat{q}$ and $\hat{p}$ as in the description herein; however, these are the same quantities and differ only in notation). The different code words of the QEC grid code are represented by the filled circles.

The QEC grid code is defined by associating each generator of the lattice with a generator of the stabilizer group, $s_j \to \hat{T}(s_j)$. The (infinite) stabilizer group is then given by $$\mathcal{S} = \left\{ \prod_{j=1}^{2m} \hat{T}(s_j)^{a_j} \,\middle|\, a \in \mathbb{Z}^{2m} \right\},$$

with each stabilizer associated with a point on the lattice $\Lambda$. QEC grid code words are defined to be in the simultaneous +1 eigenspace of all stabilizers.

The generators of the quantum translation, $\hat{T}$, associated with the generators of the stabilizer group are given by $$\hat{g} = -iS\Omega\hat{x},$$

such that the jth generator of the stabilizer group is given by $\hat{T}(s_j) = \exp\{i\hat{g}_j\}$. Measuring the stabilizer $\hat{T}(s_j)$ is equivalent to measuring the modular quadrature coordinate $\hat{g}_j$ mod $2\pi$, and in particular eigenstates of $\hat{T}(s_j)$ are also eigenstates of $\hat{g}_j$.

The stabilizers of the QEC grid code have a continuous spectrum. Restricting the code space to the +1 eigenspace of the stabilizers thus imposes an infinite amount of constraints, restricting the eigenvalues of $\hat{g}_j$ to be within the countable set $g_j = 0$ mod $2\pi$ within the uncountable eigenstates with eigenvalues $g_j \in \mathbb{R}$. The intersection of the +1 eigenspace of each stabilizer is a finite dimensional space, with a dimension d specified below. Quadrature coordinate eigenstates are equivalent to infinitely squeezed states which contain an infinite amount of energy, making the code words unphysical. As a result a realistic, finite-energy version of the code words stabilizer group $\mathcal{S}$ is described below.

The symplectic Gram matrix of the lattice $\Lambda$, setting the pairwise commutation relations of the stabilizer generators, is given by $$A = S\Omega S^T,$$

such that $\hat{T}(s_j)\hat{T}(s_k) = \hat{T}(s_k)\hat{T}(s_j)e^{2\pi i A_{jk}}$. In order for the stabilizers to commute with each other, $\Lambda$ should be symplectically integral, meaning that A should only contain integers.

Associated with the lattice $\Lambda$, the symplectic dual lattice $\Lambda^*$ is defined as the ensemble of points that have an integer symplectic form with the lattice points $\Lambda$, $$\Lambda^* = \left\{ v \,\middle|\, S\Omega v \in \mathbb{Z}^{2m} \right\} \quad \text{(Eqn. 1)}$$

Henceforth, $\Lambda^*$ is referred to as the dual lattice instead of the more precise term symplectic dual lattice. Since the lattice is symplectically integral, the definition of $\Lambda^*$ implies that $\Lambda \subseteq \Lambda^*$. One choice of generator matrix for the dual lattice $\Lambda^*$ is obtained from:

$$S^* = A^{-1}S.$$

Associating a translation to each point in the dual lattice, Eqn. 1 implies that the set of translation operators $\{\hat{T}(\lambda^*) | \lambda^* \in \Lambda^*\}$ forms (modulo phases) the centralizer of $\mathcal{S}$ in the group of translations, i.e. corresponds to all translations that commute with all elements of the stabilizer group. In a QEC code, logical operators correspond to operators that leave the stabilizer group invariant. Here, all translations are associated with a logical Pauli operator by a dual lattice vector. Since translations that differ by a lattice vector are equivalent in the logical subspace, the logical information is encoded in the dual quotient group $\Lambda^*/\Lambda$ and the number of distinct logical operators is given by the number of dual lattice points inside the fundamental parallelotope of $\Lambda$. Put another way, the number of distinct logical operators is given by the ratio of volumes between the fundamental parallelotope of the base and dual lattices. Defining the determinant of a lattice to be $\det(\Lambda) = \det(A)$, the condition to encode a d-level qudit with $d^2$ logical Pauli operators is that $$\det(\Lambda) = d^2.$$

To investigate multimode codes, it is desirable to search for codes that can be obtained by scaling the lattice size by a constant $c \in \mathbb{R}$, starting with a symplectically integral lattice $\Lambda$. Importantly, the condition that the translations $\{\hat{T}(s_j)\}$ commute imposes constraints on the attainable code dimension d. The determinant of the lattice, which sets the code dimension, scales as $$\det(c\Lambda) = c^{4m}\det(\Lambda) \quad \text{(Eqn. 2)}$$

On the other hand, the symplectic Gram matrix, which sets the commutation relations of the stabilizers, scales as $$A(c\Lambda) = c^2 A(\Lambda) \quad \text{(Eqn. 3)}$$

In other words, the code dimension scales as a volume, while the commutation relations between the stabilizers scale as an area. Note that the single-mode case is special since area and volume coincide, and scaling a single-mode lattice by any constant $c = \sqrt{a}$ with $a \in \mathbb{Z}$ an integer results in a valid code. However, multimode ($m \geq 2$) QEC grid codes are more constrained than their single-mode counterpart since the conditions given by Eqns. 2 and 3 do not coincide.

Denote $\Lambda_0$ the smallest integral lattice that can be built by scaling $\Lambda$, and denote the associated symplectic Gram matrix $A_0$. Under the scaling by c, the elements of A should remain integers, which imposes the constraint that $c^2 = a \in \mathbb{Z}$ be an integer. Combining with Eqn. 2, it may be shown that a lattice $\Lambda_0$ allows for codes of dimension $$d = a^m \det(S_0) \quad \text{(Eqn. 4)}$$

In particular, if $\det(S_0) = 1$ such that the lattice encodes a single logical state, scaling the size of the lattice allows to encode ensembles of m qudits of dimension a. For a single-mode two-dimensional lattice, the lattice can be rescaled such that $\det(\Lambda_0) = 1$, and since $m = 1$ all code dimensions are possible.

While scaling a lattice provides for codes out of known symplectically integral lattices, it is not the only allowed operation. Consider the basis $S' = SO$ where $O \in O(\mathbb{R}, 2m)$—

Sp($\mathbb{R}$, 2m) is orthogonal but not symplectic. For example, a two-mode rotation in the quadrature coordinates $\hat{q}_1$, $\hat{q}_2$ that leaves their conjugate coordinates $\hat{p}_1$, $\hat{p}_2$ invariant is orthogonal but not symplectic. With respect to the Euclidean norm, S and S' are bases for two equivalent lattices, $SS^T = S'S'^T$, but the symplectic Gram matrix associated with these bases are not the same, $S\Omega S^T \neq S'\Omega S'^T$. This means that for a general basis S where $A = S\Omega S^T$ is not integral, there can be an orthogonal transformation such that $A' = S'\Omega S'^T$ is integral. In other words, viewing the symplectic form as a sum of areas, there can be special "rotations" of the lattice where these areas add up to integers for each pair of stabilizers. To search for codes that do not respect Eqn. 4, the strategy described herein is to scale a lattice to the desired volume, and then search for an orthogonal transformation O such that A' is integral. Note that once a solution is found using this procedure, say for dimension d', then all solutions of dimension $d'a^m$ are also valid per Eqn. 4.

The techniques described herein primarily focus on encoding a qubit d=2 in multiple modes. Each vector of the dual lattice $\Lambda^*$ is associated with a logical Pauli operator $\overline{P}$, $\overline{P} \in \{\overline{X}, \overline{Y}, \overline{Z}\}$. For each logical Pauli operator $\overline{P}$, choose a base representative $p_0$ such that any translation by p with $\overline{T}(p) = \overline{U}(p)$ is expressed as $p = p_0 + \lambda$ for some $\lambda \in \Lambda$. Define the set of points $P = p_0 + \Lambda$. Define a 3×2m matrix where each row sets one of these base representatives $$L_0 = \begin{pmatrix} x_0 \\ y_0 \\ z_0 \end{pmatrix}, \quad \text{(Eqn. 5)}$$

with $x_0$, $y_0$ and $z_0$ associated with the logical Pauli operators $\overline{X}$, $\overline{Y}$ and $\overline{Z}$, respectively. Without loss of generality, choose the representatives of minimum length with respect to the Euclidean norm for each Pauli operator, such that $\overline{T}(p) = \overline{U}(\overline{P}) \Rightarrow |p| \geq |p_0|$. The logical identity operator is omitted from Eqn. 5, since it corresponds to the stabilizers with the trivial base representative 0.

The following may also make use of grid codes encoding a single state, d=1. Such codes may be referred to as "qunaught" states since they carry no quantum information, and are labeled with a subscript ∅. The single-mode square qunaught state is sometimes referred to as a sensor state since it can be used to precisely measure translations in two conjugate quadrature coordinates simultaneously.

Finite-Energy Multimode QEC Grid States

The previous section considered grid states that extend infinitely in phase space. In other words, the eigenstates of translation operators are superpositions of infinitely squeezed states containing an infinite amount of energy.

In this section, finite-energy QEC grid code states are considered that are obtained by taking a m-mode envelope of the form $$\hat{E}_\beta = \exp\left(-\sum_{j=1}^m \beta_j \hat{n}_j\right), \quad \text{(Eqn. 5)}$$

where $\beta_j$ parametrizes the extent of the QEC grid mode states in the jth mode. This envelope can be interpreted as the multiplication of the grid state by the density matrix of a m-mode thermal state, motivating the notation choice "β". Alternatively, Eqn. 5 can be interpreted as a gaussian envelope in phase space since $\hat{n}_j = (\hat{q}_j^2 + \hat{p}_j^2 + 1)/2$.

The finite-energy logical code words $\overline{\psi} = 0, 1$ are then defined as $$|\overline{\psi}_\beta\rangle = \mathcal{N}_{\psi,\beta} \hat{E}_\beta |\overline{\psi}_0\rangle,$$

with $\mathcal{N}_{\psi,\beta}$ a normalization constant and $|\overline{\psi}_0\rangle$ the ideal, infinite-energy code words.

Define finite-energy stabilizers from the similarity transformation induced by the envelope, $$\hat{T}_{j,\beta} = \hat{E}_\beta \hat{T}(s_j) \hat{E}_\beta^{-1},$$
$$= \exp\{i\hat{E}_\beta \hat{g}_j \hat{E}_\beta^{-1}\}.$$

Finite-energy code words are exact +1 eigenstates of these operators, $\hat{T}_{j,\beta}|\rangle = |\overline{\psi}_\beta\rangle$. Based on $\hat{g} = -lS\Omega\hat{x}$, the generators of translations of the stabilizer group transform to $$\hat{E}_\beta \hat{g} \hat{E}_\beta^{-1} = -lS\Omega\{\cosh[\text{Diag}(\beta)] + i\sinh[\text{Diag}(\beta)]\Omega\}\hat{x},$$

where the 2m-dimensional vector $\beta = (\beta_1, \beta_2, \ldots \beta_m) \otimes (1,1)$ and Diag correspond to the operation of building a diagonal matrix from a vector. In the limit $\beta \to 0$, the translation operators, $\hat{T}_{j,0} = \hat{T}(s_j)$ may be recovered.

Returning to FIG. 4, an illustrative finite envelope is shown over the depicted grid states by the circular region centered over the origin. The states within this envelope may therefore be considered finite-energy QEC grid code states, as represented in the drawing by the darker shading for these states.

In the remaining description below, a homogeneous envelope size $\beta_j = \beta$ is considered for all j, such that $\hat{E}_\beta = \exp(-\beta \hat{n})$, with $\hat{n} = \Sigma_j \hat{n}_j$ the total excitation number. For this choice, operations that commute with $\hat{n}$ also commute with the envelope, and such operations may be referred to herein as envelope-preserving. Gaussian operations in that category, $\hat{Q}(O)$ with $O \in Sp(2m, \mathbb{R}) \cap O(2m, \mathbb{R})$, can be implemented by a combination of beam-splitters and phase shifters, e.g., passive linear optics. Envelope-preserving gates also include non-linear gates such as the unitaries generated by Kerr and cross-Kerr interactions. Importantly, envelope-preserving operations are exact for finite-energy QEC grid codes.

Taking the logarithm of the stabilizers $\hat{T}_{j,\beta}$, and in analogy with continuous-variable cluster states, define the finite-energy nullifiers of the code $$\hat{d}_j = \left(\frac{[s_j^T \Omega \hat{x} \bmod l/\cosh\beta]}{\sqrt{2|s_j|\tanh(\beta)}} - i\sqrt{\frac{\tanh(\beta)}{2|s_j|}} s_j^T \cdot \hat{x}\right) \quad \text{(Eqn. 6)}$$

The finite-energy code words are then also defined by $\hat{d}_j|\overline{\psi}_\beta\rangle \approx 0 \forall j$. Without the modular part of the first term, $\hat{d}_j$ corresponds to the nullifier of a finitely squeezed state.

Gauge Choices

As demonstrated by:

$$\Lambda = \{S^T a \mid a \in \mathbb{Z}^{2m}\}$$
$$\mathcal{S} = \left\{\prod_{j=1}^{2m} \hat{T}(s_j)^{a_j} \mid a \in \mathbb{Z}^{2m}\right\},$$

the points of the lattice $\Lambda$ are in one-to-one correspondence with the elements of the stabilizer group $\mathcal{S}$. However, $\lambda \in \Lambda$ does not imply that $\hat{T}(\lambda) \in \mathcal{S}$, and the correspondence between elements of $\Lambda$ and $\mathcal{S}$ requires an additional phase.

For example, take two stabilizers $\hat{T}(s_1)$ and $\hat{T}(s_2)$ commuting by $2\pi$, such that $s_1^T \Omega s_2 = 1$. Following the relationship for $\hat{T}(u)\hat{T}(v)$, $\hat{T}(s_1+s_2)|\psi\rangle = -\hat{T}(s_1)\hat{T}(s_2)|\psi\rangle = -|\psi\rangle$, for all logical code words $|\psi\rangle$. Within the lattice points $\Lambda$, it is therefore possible to distinguish between two subsets $\Lambda_\pm \subseteq \Lambda$ such that, for states $|\psi\rangle$ in the code space, $$\Lambda_\nu = \{\lambda \in \Lambda | \hat{T}(\lambda)|\psi\rangle = \nu | \psi\rangle\},$$

with $\nu = \pm$. For example, for the single-mode square qunaught state with generator matrix $S_\emptyset = \mathbb{1}_2$, the generator vectors are $s_1, s_2 \in \Lambda_+$, while their sum $s_1+s_2 = (1; 1) \in \Lambda_-$. For a qubit encoded in a single-mode, all lattice vectors associated with the stabilizer group necessarily belong to $\Lambda_+$ since there are only two generators and the dimension condition imposes that $|s_1^T \Omega s_2| = 2$.

It may be useful to allow different gauge choices $\mu \in \mathbb{Z}_2^{2m}$ such that for the generators of the stabilizer group $\hat{T}(s)|\psi\rangle = (-1)^{\mu_j}|\psi\rangle$ for states $|\psi\rangle$ in the code space. The stabilizer group is correspondingly updated to $$\mathcal{S}_\mu = \left\{ \prod_{j=1}^{2m} [(-1)^{\mu_j} \hat{T}(s_j)]^{a_j} \,\middle|\, a \in \mathbb{Z}^{2m} \right\},$$

Different choices for $S$ or $\mu$ can lead to different subsets $\Lambda_\pm$ for the same base lattice $\Lambda$.

Defining $A_\Delta$ as the lower triangular part of the symplectic Gram matrix $A = S\Omega S^T$, the lattice vectors $\lambda \in \Lambda$ may be classified according to the gauge $\mu$:

$$\nu_\mu(\lambda) = \exp\{i\pi \lambda^T S^{-1} [A_\Delta(S^{-1})^T \lambda + \mu]\}$$

Since $\Lambda$ is symplectically integral, $\nu_\mu(\lambda) \in \{\pm 1\}$. Moreover, if $\lambda \in \Lambda_\nu$, then its inverse is also in the same set, $-\lambda \in \Lambda_\nu$.

In a similar fashion to the stabilizer gauge $\mu$, define a gauge for the logical Pauli operators $\upsilon \in \mathbb{Z}_2^3$, which is equivalent to a so-called Pauli frame. Accordingly, define the eigenstate of the logical Pauli operator $\bar{P}$ such that $(-1)^{\upsilon_P}\hat{T}(p_0)|\psi_{+P}\rangle = |\psi_{+P}\rangle$. One of the three elements of $u$ is redundant, as the gauge is fully set by $\upsilon_x$ and $\upsilon_z$. Here all three elements may be kept for convenience. In a similar manner to the lattice vector subsets $\Lambda_\pm$, define the subsets $P_\pm$ for each Pauli operator $P \in \{X, Y, Z\}$ as $$P_\nu = \{p \in P | \hat{T}(p)|\psi_{+P}\rangle = \nu | \psi_{+P}\rangle\},$$

which depends on the stabilizer gauge $\mu$, the Pauli frame gauge $\upsilon$ and the base representatives $\{p_0\}$. The sign associated with a particular vector $p \in P$ is computed using $$\nu_{\mu,\upsilon}^P(p) = e^{i\pi[p_0^T \Omega p + \upsilon_P]}\nu_\mu(p - p_0),$$

and logical Pauli operators are given by $$\hat{U}(\bar{P}) = \nu_{\mu,\upsilon}^P(p)\hat{T}(p)$$

for all $p \in P = p_0 + \Lambda$.

In order for the Pauli eigenstates $|\psi_{\pm P}\rangle$ to have eigenvalue $\pm 1$, note that $\nu_\mu(2p_0)$ should equal 1, where $2p_0 \in \Lambda$ by construction. Indeed, the eigenvalues of translations by $\hat{T}(p_0)$ are constrained to be $\sqrt{\nu_\mu(2p_0)}$, such that $\nu_\mu(2p_0) = -1$ implies that $\hat{T}(p_0)|\psi\rangle = \pm i|\psi\rangle$. To constrain the eigenvalues of the Pauli operators to be real, add the condition that $$2A^{-1}\mu \bmod 2 = 0.$$

This condition is respected in the trivial gauge $\mu=0$, and in the special case of a single-mode QEC grid code qubit, this is the only gauge respecting this condition. However, for multimode lattices, there are multiple gauges allowed.

Figures 5A, 5B, 5C:
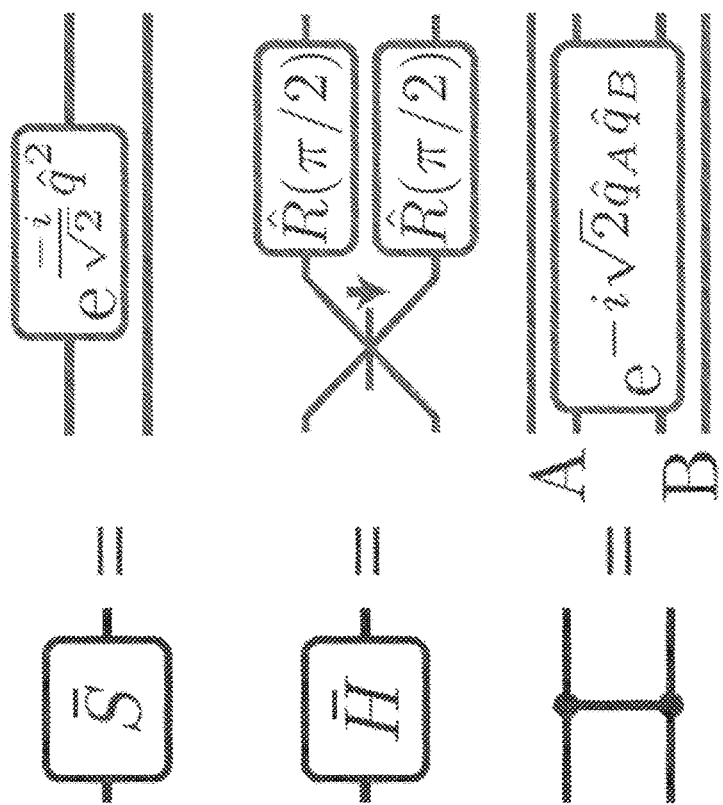
FIGS. 5A-5C depict aspects of a tesseract grid code, according to some embodiments.

As an example of the most salient aspects of the above-described QEC grid codes, FIGS. 5A-5C depicts the stabilizer generators and logical operators, as well as example qubit manipulations, for one choice of lattice codes referred to herein as the 'tesseract code.' In the example of FIG. 5A the stabilizer generators $s_j$, which are comprised of the set $s_1$, $s_2$, $s_3$ and $s_4$, are depicted. These stabilizer generators are of equal length and are orthogonal to one another. To perform quantum error correction, dissipation circuits are applied to the multimode system, with a dissipation circuit performed for each stabilizer generator. The tesseract code is an example of a two-mode code, and so has four stabilizer generators. FIG. 5A depicts the projection onto the (q,p) phase space of the first and second modes (i.e., $s_1$ is the projection of the first mode onto q, $s_2$ is the projection of the first mode onto p, $s_3$ is the projection of the second mode onto q, $s_4$ is the projection of the second mode onto p.) FIG. 5B depicts the logical operators (the operators that leave the stabilizer group invariant) and FIG. 5C depicts implementations of logical Clifford gates given the code space described by the tesseract code. The tesseract code is described in further detail below, but introduced here to provide context for the below discussion of quantum error correction using a given lattice code.

Quantum Error Correction

In this section, an error correction strategy for the system of FIG. 2A is described. The error correction strategy is based on engineering an ensemble of 2m dissipators, $$\dot{\rho} = \sum_{j=1}^{2m} \mathcal{D}[\hat{d}_j]\rho \qquad \text{(Eqn. 7)}$$

where $\mathcal{D}[\hat{o}]\bullet = \hat{o}\bullet\hat{o}^\dagger - \{\hat{o}^\dagger\hat{o},\bullet\}/2$ is the dissipation superoperator and $\rho$ is the multimode state encoding the logical quantum information. This strategy relies on the fact that the steady state of the master equation above is given by $\hat{d}_j|\psi\rangle = 0$ for all $j$, which precisely corresponds to the code space.

Instead of implementing directly the continuous dissipators of Eqn. 7, the oscillators-bath interaction is discretized, and the baths replaced by a single qubit that is frequently reset. This can be achieved through repeated oscillators-bath interactions of the form $$\hat{U}_{stab}^{(j)} = e^{-i\sqrt{\Gamma_j}\left(\hat{d}_j\sigma_- + \hat{d}_j^\dagger\sigma_+\right)}$$

where $\Gamma_j$ is an effective (dimensionless) cooling rate. Resetting the ancilla qubit to its ground state $|g\rangle$ and repeating this interaction, the entropy from the oscillators is removed in such a way as to cool the system towards the +1 eigenspace of the exact $\hat{T}_{j,\beta}$ stabilizer of the finite-energy QEC grid code. One interaction and reset cycle may be referred to as a dissipation round, and the full code space is stabilized by alternating dissipation rounds for each of the 2m stabilizer generators $\hat{T}_{j,\beta}$.

Since an m-mode code has 2m stabilizer generators, a combination of at least 2m dissipation circuits are applied (with one dissipation circuit being applied in each dissipation round). In some embodiments, however, more than 2m dissipation circuits could be applied, which may be desirable especially for lattices which have more than 2m lattice vectors of minimum length (counting once a vector and its inverse).

Figure 6A:
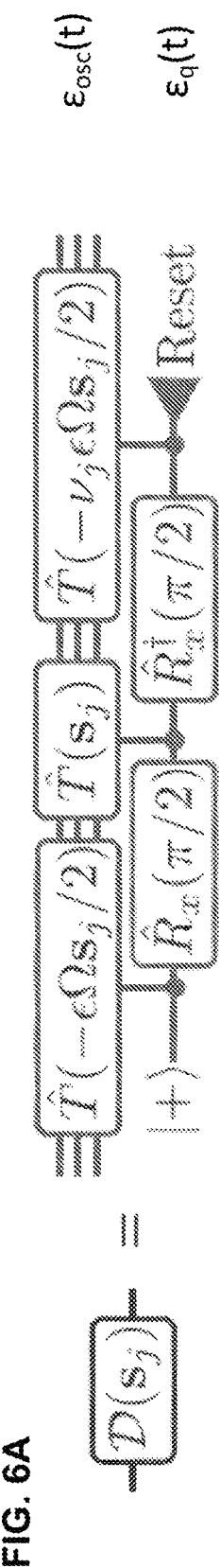
FIG. 6A-6C depict illustrative examples of a dissipator circuit for quantum error correction, according to some embodiments.
Figure 6B:
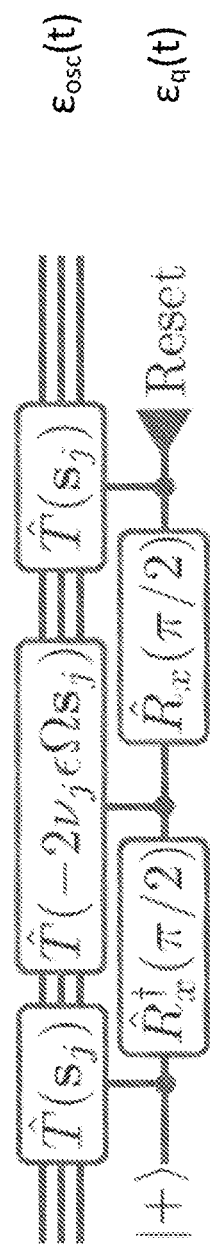
Figure 6C:
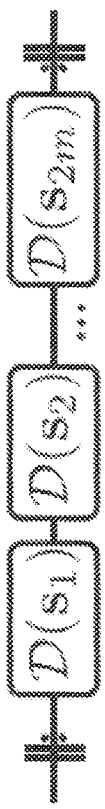

FIG. 6A-6B depict illustrative examples of a dissipator circuit for quantum error correction, according to some embodiments. In practice, the dissipator circuit $\mathcal{D}(s_j)$ depicted in FIG. 6A or FIG. 6B is performed 2m times for each stabilizer generator $s_j = s_1, s_2, \ldots s_{2m}$, as shown in FIG. 6C. FIGS. 6A and 6B represent two different illustrative dissipator circuits, which are described above.

The dissipator circuit includes two horizontal sections, with the upper section indicating drives $\varepsilon_{osc}(t)$ applied to the bosonic modes, and the lower section indicating drives $\varepsilon_q(t)$ applied to the ancilla qubit. For instance, the dissipators of FIGS. 6A and 6B each depicts a first multimode translation $\hat{T}$ applied to the bosonic modes, followed by a rotation $\hat{R}_x$ applied to the qubit, followed by a second multimode translation $\hat{T}$ applied to the bosonic modes, followed by a rotation $\hat{R}_x^\dagger$ applied to the qubit, followed by a third multimode translation $\hat{T}$ applied to the bosonic modes. Initially, the ancilla may be prepared in a superposition state $(|g\rangle + |e\rangle)/\sqrt{2}$ as represented by $|+\rangle$ in the drawing. Moreover, the state of the ancilla may be reset to its ground state $|g\rangle$ subsequent to the final translation drive.

As a result, each dissipator circuit applies a conditional translation based on one of the stabilizer generators $s_j$, for which various options are described below. For each of the lattice code choices described (e.g., the tesseract code), the same dissipator circuit can be applied, since the choice of lattice code dictates the values of $s_j$, which are part of the dissipator circuit.

In particular, the dissipator circuit includes a symmetrized controlled multimode translation, $$C\hat{T}(v) = e^{i\frac{\hat{\sigma}_z}{2}l s^T \Omega v}$$

which effects a translation in phase space by $\pm v/2$ if the ancilla is in $|g\rangle$ (the ground state) or $|e\rangle$ (the first excited state), respectively. The C in front of the translation is used to indicate that the translation is controlled; specifically, that the translation is $+v/2$ when the ancilla is in $|g\rangle$ and $-v/2$ when the ancilla is in $|e\rangle$. The translation operation, as described further below, also imparts a phase onto the ancilla qubit.

This type of multimode translation operation can be realized by using a qubit coupled dispersively to multiple modes. For example, consider the Hamiltonian for bosonic modes coupled to an ancilla qubit:

$$\hat{H} = \sum_{j=1}^{m} \left[ \frac{\chi_j}{2} \hat{a}_j^\dagger \hat{a}_j \hat{\sigma}_z + \varepsilon_j(t)\hat{a}_j^\dagger + \varepsilon_j^*(t)\hat{a}_j \right]$$

with $\chi_j$ the dispersive interaction between the jth mode and the ancilla, and $\varepsilon_j(t)$ the classical drive applied to the jth mode. The classical drives $\{\varepsilon_j\}$ displace the state of the different oscillators, which then rotate in different directions depending on the state of the ancilla. With suitable echo pulses, this strategy can be used to generate any controlled translation. The controlled displacement rate in each mode depends on the drive amplitude and the dispersive shift, $\chi_j \varepsilon_j$, such that this type of interaction can be implemented in systems with small dispersive coupling by considering strong drives. Moreover, the drive amplitude in each mode can be independently adjusted, and the dispersive shifts of the ancilla qubit to each mode need not be matched. Finally, there is no specific restriction on the oscillator mode frequencies.

Multimode controlled translations can also be implemented in other platforms such as in the motional modes of trapped ions. In this architecture, controlled translations are generated by a laser which activates a state-dependent force. Multiple state-dependent forces in different modes can then be activated using multiple lasers, a type of interaction which has already been realized in the context of (ion-ion) multi-qubit gates.

Returning to FIGS. 6A-6C, the first two translations of each dissipator circuit shown in FIGS. 6A and 6B may be considered to measure the state of the multimode bosonic system along the relevant stabilizer generator vector and to impart a phase to the ancilla qubit based on this state, whereas the third translation of each dissipator circuit corrects the state of the multimode bosonic system based on the state of the ancilla qubit. The second qubit rotations $\hat{R}_x^\dagger$ have the effect of transforming the phase of the ancilla qubits into population information (that is, produce a superposition of states that reflect the phase). This rotation allows the last controlled translation operation to correct any ancilla qubit and/or multimode errors that may have occurred based on the population state of the ancilla qubit.

In terms of ancilla qubit decay errors during a controlled translation, these result in an effective rotation and translation:

$$C\hat{T}_{err} = \hat{\sigma}_{ierr} \hat{T}[e] \Pi_j \hat{R}_j(\varphi_j),$$

where the rotation in each mode is upper bounded by $|\varphi_j| \leq |\chi_j T|$ with T the interaction time and ierr=$\pm$. The translation error $\hat{T}(e)$ occurs on a line parametrized by the time of the error, $t_{err} \in [0,T]$. In the limit where the dispersive coupling is small, $\chi_j \to 0$, and where the controlled translation is generated in a straight line, the rotation error disappears and the translation error is colinear with the desired translation, $e = \eta s_j$ with a ratio $\eta \in [0,1/2]$. The rotation error can also be reduced by considering more than one echo pulse during the controlled translation. To simplify the analysis below, it is assumed that ancilla errors are given by bit flips rather than qubit decay, propagating as errors of the form $e = \eta s_j$ with $\eta \in [0,1]$.

For the dissipation circuit of FIG. 6A, the middle controlled translation leaves the state of the bosonic mode effectively displaced by $\pm s_j/2$. For a single-mode QEC grid code, this effectively applies a logical Pauli operation, but in general it leaves the state outside of the code space. To recover the original subspace, the state is steered towards the $-1$ eigenspace of the corresponding stabilizer. As shown in FIGS. 6A, this is achieved by changing the sign of the last small controlled translation using the gauge $v_j = (-1)^{\mu_j}$.

A rotation of the qubit $R_x(\theta)$ is given by:

$$R_x(\theta) = \begin{pmatrix} \cos(\theta/2) & -i\sin(\theta/2) \\ -i\sin(\theta/2) & \cos(\theta/2) \end{pmatrix}$$

and may be performed by directing a suitable drive to the ancilla qubit.

Multimode Controlled Translations

As described above, the dissipator circuit includes a symmetrized controlled multimode translation, $$C\hat{T}(v) = e^{i\frac{\hat{\sigma}_z}{2} \vec{s}^T \Omega v}$$

which effects a translation in phase space by $\pm v/2$ if the ancilla is in $|g\rangle$ (the ground state) or $|e\rangle$ (the first excited state), respectively. This section described how to realize this controlled translation in multiple bosonic modes.

Consider a single qubit coupled to multiple modes via a pairwise dispersive interaction, with a drive $\varepsilon_j(t)$ on each mode, in the Hamiltonian given above:

$$\hat{H}(t) = \sum_j \left[\frac{\chi_j}{2} \hat{a}_j^\dagger \hat{a}_j \hat{\sigma}_z + \varepsilon_j(t)\hat{a}_j^\dagger + \varepsilon_j^*(t)\hat{a}_j\right].$$

This Hamiltonian generates displacements, but also imparts a phase to the ancilla qubit and a qubit state-dependent rotation of the bosonic modes. In order to echo out the ancilla-dependent rotation due to the dispersive shift, consider an evolution in K steps with a qubit flip between each step:

$$\hat{U} = \prod_{k=1}^{K} \hat{\sigma}_x \mathcal{T} e^{-i\int_{t_{k,i}}^{t_{k,f}} d\tau \hat{H}(\tau)},$$

where the kth step is defined ranging from $t_{k,i}$ to $t_{k,f}$ and the product is time-ordered. The final qubit flip is omitted if K is odd. Commute through the qubit flips $\hat{\sigma}_x$ such that, during the kth step, the sign of $\hat{\sigma}_z$ is multiplied by $z_k \in \{\pm 1\}$ which may be included in a continuous function $z(t)$.

With this simplification, the whole evolution can be written in a single step, $\hat{U} = \mathcal{T} e^{-i\int_0^T d\tau \hat{H}_z(\tau)}$, with $$\hat{H}_z(t) = \sum_j \left[\frac{\chi_j}{2}\hat{a}_j^\dagger \hat{a}_j \hat{\sigma}_z z(t) + \varepsilon_j(t)\hat{a}_j^\dagger + \varepsilon_j^*(t)\hat{a}_j\right],$$

$$= \frac{\vec{\chi} \cdot \vec{\hat{n}}}{2}\hat{\sigma}_z z(t) + \vec{\hat{a}}^\dagger \cdot \vec{\varepsilon} + \vec{\varepsilon}^* \cdot \vec{\hat{a}}.$$

Considering the form of the Hamiltonian, take an ansatz for the resulting unitary $$\hat{U} = e^{i\theta \frac{\hat{\sigma}_z}{2}} e^{\vec{\hat{a}}^\dagger \cdot (\vec{\gamma} + \vec{\delta}\hat{\sigma}_z)} e^{-(\vec{\gamma}^\dagger + \vec{\delta}^\dagger \hat{\sigma}_z) \cdot \vec{\hat{a}}} e^{-i\vec{\phi} \cdot \vec{\hat{n}} \hat{\sigma}_z},$$

where $\theta$ sets the ancilla qubit phase, $\vec{\phi} \in \mathbb{R}^m$ represents the qubit-dependent rotation of each mode and $\vec{\gamma}, \vec{\delta} \in \mathbb{C}^m$ represent the displacement and controlled-displacement of each mode, respectively. Extract a differential equation for each parameters using Schrödinger's equation, $\dot{U} = -i\hat{H}_z(t)\hat{U}$. Neglecting terms leading to an irrelevant global phase, obtain:

$$\dot{\theta} = -2\text{Re}[\vec{\varepsilon}^* \cdot \vec{\delta}],$$

$$\dot{\gamma}_j = -i\frac{\chi_j}{2}z(t)\delta_j - i\varepsilon_j,$$

$$\dot{\delta}_j = -i\frac{\chi_j}{2}z(t)\gamma_j,$$

$$\dot{\phi}_j = \frac{\chi_j}{2}z(t)$$

In order to echo out the qubit state-dependent rotation of the oscillators, choose a $z(t)$ such that $\vec{\phi}(T)=0$. The differential equations above can be solved to yield the parameters $$\theta(t) = -2\int_0^t d\tau \, \text{Re}[\vec{\varepsilon}(\tau)^* \cdot \vec{\delta}(\tau)],$$

$$\gamma_j(t) = -i\int_0^t d\tau \cos[\phi_j(\tau) - \phi_j(t)]\varepsilon_j(\tau),$$

$$\delta_j(t) = \int_0^t d\tau \sin[\phi_j(\tau) - \phi_j(t)]\varepsilon_j(\tau),$$

$$\phi_j(t) = \frac{\chi_j}{2}\int_0^t d\tau z(\tau),$$

Using the Baker-Campbell-Hausdorff (BCH) formula to separate the overall and controlled translations, rewrite the resulting unitary as $$\hat{U} = e^{i\theta' \frac{\hat{\sigma}_z}{2}} \times \hat{T}(\vec{g}) \times C\hat{T}(\vec{d}),$$

where $\vec{g}, \vec{d} \in \mathbb{R}^{2m}$ as $\vec{g}=\text{Vec}[\vec{\gamma}(T)]$ and $\vec{d}=\text{Vec}[2\vec{\delta}(T)]$ with $\text{Vec}[\vec{v}]=\sqrt{2}/l \times \text{Re}[\vec{v}] \oplus \text{Im}[\vec{v}]$. The (exact) BCH expansion term yields a correction to the phase $$\theta' = \theta + 2\text{Im}[\vec{\gamma}^\dagger \cdot \vec{\delta}].$$

The desired controlled translation is therefore obtained by applying the drives $\{\varepsilon_j\}$, with a displacement and a qubit phase correction at the end. Alternatively, the drives may be chosen such that $\vec{\gamma}(T)=\vec{0}$ and $\theta(T)=0$. For example, to obtain a controlled translation $C\hat{T}(\vec{b})$, the evolution can be split into two parts and the drives selected as:

$$\varepsilon_j(t) = \alpha_{d,j}[\delta(t) - 2\delta(t - T/2)\cos(\chi_j T/4) + \delta(t - T)\cos(\chi_j T/2)],$$

$$\alpha_{d,j} = [C\vec{b}]_j \frac{l}{2\sin(\chi_j T/2)},$$

where $\delta(t)$ is the Dirac delta function. This drive can approximately be realized in a system where the displacements by $\alpha_{d,j}$ can be effected in a time scale much faster than $1/\chi_j$.

Having described the process for autonomous error correction, examples of various lattice codes will be described below.

Hypercubic Lattice Code

The simplest multimode lattice is the hypercubic lattice $\Lambda=\mathbb{Z}^{2m}$, with generator matrix $S=\mathbb{1}_{2m}$ for which $\det(\Lambda_0)=1$. According to Eqn. 4, valid encodings can be obtained by scaling the hypercubic lattice are of dimension $a^m$, which is equivalent to encoding m qudits of dimension a. In this situation, the generators become $S=\sqrt{a}\,\mathbb{1}_{2m}$, with the dual lattice given by $S^*=\Omega/\sqrt{a}$.

One approach to quantum computing based on QEC grid code states is to concatenate the hypercubic lattice code encoding m qubits with another qubit code. In this approach, the information is discretized at the single-mode level, and the upper level code is mostly treated as a standard qubit code, potentially incorporating the continuous nature of the single-mode error syndromes to improve the decoding procedure.

However, it may be noted that in this concatenated construction, the logical qubit is not defined by a hypercubic lattice. In two modes, it is possible to encode a single hypercubic qubit using the basis $$S_{tess} = \sqrt[4]{2}\begin{pmatrix} 1 & 0 & 0 & 0 \\ 0 & \frac{1}{\sqrt{2}} & 0 & \frac{1}{\sqrt{2}} \\ 0 & 0 & 1 & 0 \\ 0 & \frac{1}{\sqrt{2}} & 0 & -\frac{1}{\sqrt{2}} \end{pmatrix}$$

which is related to $\mathbb{1}_4$ by a scaling factor $$\sqrt[4]{2}$$

and a rotation by $\pi/4$ in the $p_1$, $p_2$ plane, a non-symplectic transformation. That QEC grid code is referred to herein as the tesseract code, which has logical operators of length $$\sqrt[4]{2}$$

times larger than the single-mode square code. From the intuition of the Gaussian translation error model, this code is therefore more robust than the square code against errors.

Beyond the encoding of a qubit, $d=2$, all code dimensions that can be expressed as the sum of three squares $$d = a^2 + b^2 + c^2,$$

for a, b, $c \in \mathbb{Z}$, can be implemented as a two-mode hypercubic code. Legendre's three-square theorem specifies which numbers cannot be written as a sum of three squares. Applied to the above, there exists codes of all dimensions that cannot be written as $d=4^f(8g+7)$ for f, g non-negative integers. All hypercubic codes of size $d\leq 20$ are therefore possible except for $d=7,15$.

Tesseract Lattice Code

The tesseract code is based on a four-dimensional hypercubic lattice, such that the stabilizer generators are all of equal length, $$|s_j| = \sqrt[4]{2}$$

for all j, and are all orthogonal to each other, $s_j \cdot s_k = 0$ for $j \neq k$. As illustrated in FIG. 5B, the base representative of the logical Pauli operators for the tesseract code are chosen as:

$$L_{0,tess} = \begin{pmatrix} x_0 \\ y_0 \\ z_0 \end{pmatrix} = \sqrt[4]{2}\begin{pmatrix} 1/2 & 0 & 1/2 & 0 \\ 1/2 & 1/\sqrt{2} & 1/2 & 0 \\ 0 & 1/\sqrt{2} & 0 & 0 \end{pmatrix} \quad \text{(Eqn. 8)}$$

The $\overline{Y}$ operator of the tesseract code has a length $\sqrt{2}$ larger than the $\overline{X}$, $\overline{Z}$ operators. An important distinction between the tesseract code and some single-mode grid codes is that logical operators of the tesseract code are not colinear with a stabilizer vector. More precisely, $x_0=(s_1+s_3)/2$, $z_0=(s_2+s_4)/2$ and $y_0=(s_1+s_2+s_3+s_4)/2$, as illustrated in FIGS. 5A-5B and in FIG. 7A. This may be contrasted with single-mode codes in which $x_0=s_1/2$, $z_0=s_2/2$ and $y_0=(s_1+s_2)/2$.

With the choice of Pauli operators given by Eqn. 8, the logical $+\overline{Z}$ eigenstate is given by the separable state $$|+\overline{Z}\rangle = |\phi_{\sqrt[4]{2}}\rangle^{\otimes 2}.$$

The logical $-\overline{Z}$ eigenstate is given by the same tensor product of qunaught states, but choosing a mixed gauge $\mu=(0,1)$ for both modes. While Eqn. 8 is derived based on the base $\overline{Z}$ representative having support only on the first mode, an equivalent representative has support only in the second mode, $$z' = \sqrt[4]{2}(0, 0, 0, 1/\sqrt{2}).$$

In particular, a measurement in the $\overline{Z}$ basis can be performed by accessing a single one of either mode comprising the tesseract code. Alternatively, both representatives can be measured to implement a two-bit repetition code to mitigate the effect of different faults such as oscillator errors, measurement errors or ancilla decay during the measurements. Since $z_0$ and z' have support on different modes, faults in one measurement do not affect the other.

Figures 7A, 7B:
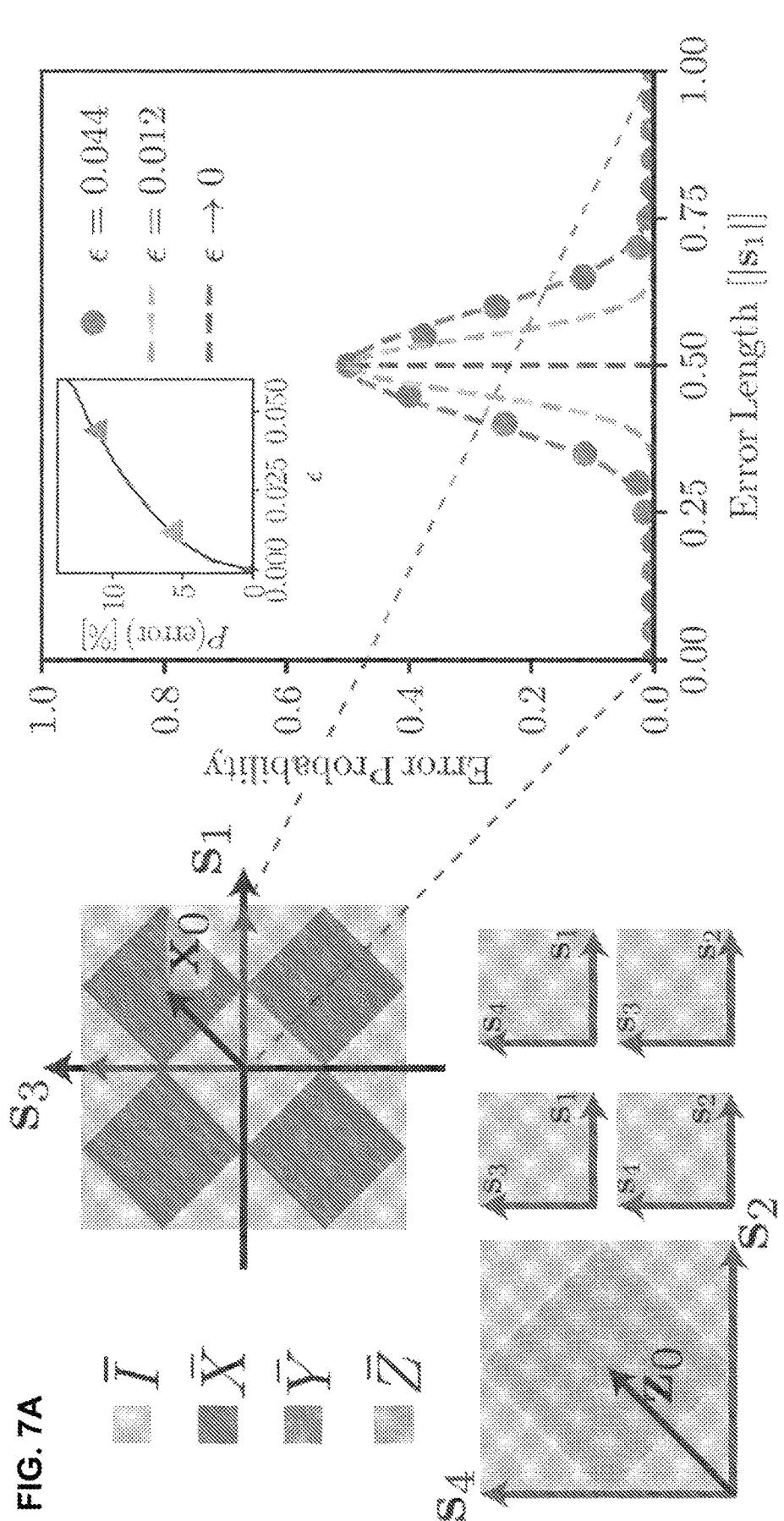
FIG. 7A depicts the effect of translation errors in the tesseract code, according to some embodiments.
FIG. 7B depicts the logical error probability in the tesseract code, according to some embodiments.

FIGS. 7A-7B depict the effect of translation errors in the tesseract code, according to some embodiments. In particular, FIG. 7A depicts logical operations applied as a function of the initial translation error given by $\text{span}(s_j, s_k)$. FIG. 7B depicts the logical error probability as a function of the length of a translation error along $s_1$. The full quantum model (dots) is compared with the classical model (dashed line). The inset of FIG. 7B shows the integrated logical error probability given that an error $\eta s_1$ occurred, with $\eta$ sampled uniformly in the interval [0,1].

$D_4$ Lattice Code

The $D_4$ lattice code is a two-mode QEC grid code based on the $D_4$ lattice, which allows the densest lattice packing in four dimensions. This particular code has several interesting features, particularly with respect to logical operations. Indeed, in contrast to the tesseract code, all single qubit Clifford gates can be performed with passive gaussian operations (envelope-preserving gates). The $D_4$ code also allows exact non-Clifford gates through envelope-preserving Kerr-type interactions.

In a similar fashion to a 3-dimensional hexagonal close-packed lattice which can be built by stacking layers of two-dimensional honeycombs lattices (stacking oranges), the $D_4$ lattice can be built by "stacking" layers of 3-dimensional body-centered cubic lattices in the fourth dimension.

Choosing a set of generators which all have support on both modes, it may be desirable to set:

$$S_{D_4} = \begin{pmatrix} 1 & 0 & 1 & 0 \\ 1 & 0 & 0 & -1 \\ 0 & 1 & -1 & 0 \\ 1 & 0 & 0 & 1 \end{pmatrix}.$$

However, this choice is not unique since the $D_4$ lattice has 12 vectors of minimal length (not counting those that differ only by a sign). The base representatives of the logical operators are chosen to be $$L_{0,D_4} = \begin{pmatrix} x_0 \\ y_0 \\ z_0 \end{pmatrix} = \begin{pmatrix} 1/2 & 1/2 & 1/2 & 1/2 \\ -1/2 & 1/2 & 1/2 & 1/2 \\ 1 & 0 & 0 & 0 \end{pmatrix}.$$

Similar to the stabilizers, this choice is not unique and for each logical Pauli operator there are 4 equivalent representatives of minimum length (not counting those that differ only by a sign). For example, the $\bar{Z}$ logical operator can be represented as $z=(\pm 1,0,0,0); (0, \pm 1,0,0); (0,0, \pm 1,0)$ or $(0,0,0, \pm 1)$, such that $\bar{Z}$ eigenstates can be described as hypercubic qunaught states $S_{\bar{Z}} = \mathbb{1}_4 = S_\varnothing^{\oplus 2}$. In the trivial gauge $\mu=0$ and with the choice of basis given by $S_{D_4}$ above:

$$|\pm \bar{Z}\rangle = |\pm \varnothing\rangle^{\otimes 2},$$

with $|\varnothing\rangle$ the single-mode square qunaught state. The "negative" qunaught state $|-\varnothing\rangle$ has also been defined as the $-1$ eigenstate of the translation operators associated to the generators of $S_\varnothing$, i.e. the square qunaught state with gauge $\mu=(1,1)$. As in the tesseract code, both code words are separable states of the two modes, and as a result can be prepared in independent modes.

Measurements in the $\bar{Z}$ basis of the $D_4$ code can be performed in both modes separately, yielding a simple two-bit repetition code that can allow the detection of one measurement error. In principle, all four orthogonal representatives may be measured and a majority vote taken to determine the most likely measurement result. However, in this case all measurement are not independent as, for example, an ancilla decay error during the $z=(1,0,0,0)$ measurement can propagate as a measurement error in the $z=(0,1,0,0)$ measurement.

Due to the four-fold rotation symmetry of the qunaught states, they have a definite excitation number modulo four, and they can be expressed in the Fock number basis as $$|+\varnothing\rangle = \sum_j c_{j+} |4j\rangle,$$

$$|-\varnothing\rangle = \sum_j c_{j-} |4j+1\rangle.$$

The fact that $n=0 \mod 4$ for the positive qunaught state can be computed by directly applying the rotation operator to the state. By expressing the negative qunaught state as a translated positive qunaught state, obtain:

$$e^{i\frac{\pi}{2}\hat{n}}|-\varnothing\rangle = e^{i\frac{\pi}{2}\hat{n}}\hat{T}[(1/2; 1/2)]|+\varnothing\rangle$$
$$= \hat{T}[(-1/2; 1/2)]|+\varnothing\rangle$$
$$= e^{i\frac{\pi}{2}}\hat{T}[(1/2; 1/2)]\hat{T}[(-1; 0)]|+\varnothing\rangle$$
$$= e^{i\frac{\pi}{2}}|-\varnothing\rangle$$

which implies that $|-\varnothing\rangle$ has support only on Fock states $n=1 \mod 4$. Importantly, since the envelope does not change the excitation number, this is also true for finite-energy states.

In contrast to single-mode QEC grid codes, the two finite-energy code words of the $D_4$ code are exactly orthogonal. However, this orthogonality has limited usefulness in practice, as logical measurements of the code words are performed through (controlled) translations which do not allow perfect distinguishability. In principle, one could perform logical measurement through excitation number measurements in a similar fashion to logical measurement of cat codes. However, this type of measurement is less robust against oscillator errors such as photon loss. Moreover, the distinguishability limit for QEC grid codes is much smaller than typical errors induced by practical measurement circuits, such that measurement of translation properties are expected to remain optimal.

FIG. 8A depicts the phase space representation of the stabilizer generators of the $D_4$ lattice grid code. The left and right graphs of FIG. 8A represent the projection onto the (q,p) phase space of the first and second mode, respectively. FIG. 8B depicts a similar representation for the logical operators of the $D_4$ lattice grid code.

FIG. 8C depicts logical Clifford operations in the $D_4$ code. In particular, the $\bar{S}$ gate can be effected by a $\pi/2$ rotation in either mode, with a rotation in the first mode represented. The $\bar{H}$ gate is implemented by a beamsplitter followed by a rotation of $\pi/4$ in both modes. The logical $C\bar{Z}$ gate is implemented by a resealed SUM gate. This gate may be represented as an operation between the second mode of A and the first mode of B, but choosing any pair of modes from the codes A and B is equivalent. FIG. 8D depicts a non-Clifford $\sqrt{\bar{G}}$ logical gate, with $\bar{G}=\bar{X}\bar{S}=(\bar{X}+\bar{Y})/\sqrt{2}$. A Kerr gate in either mode realizes this logical operation. FIG. 8E depicts a non-Clifford $\bar{G}$-controlled $\bar{G}$ logical gate, which can be realized by a cross-Kerr gate involving any pair of mode from the two $D_4$ codes.

Figure 9B:
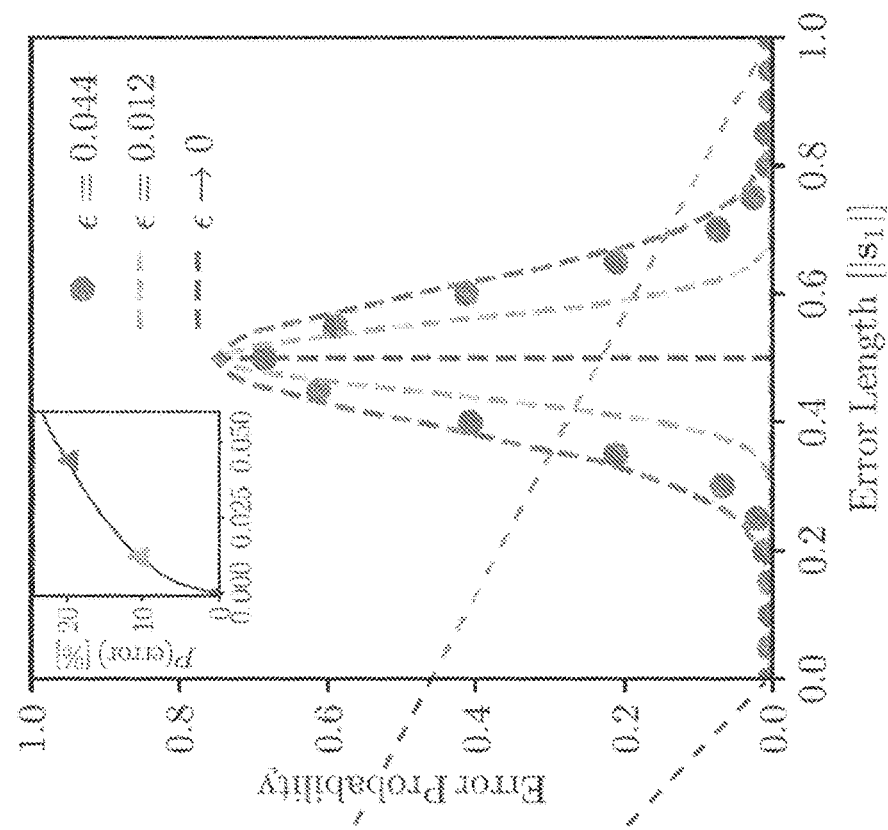
FIG. 9B depicts the logical error probability in the $D_4$ lattice code.
Figure 9A:
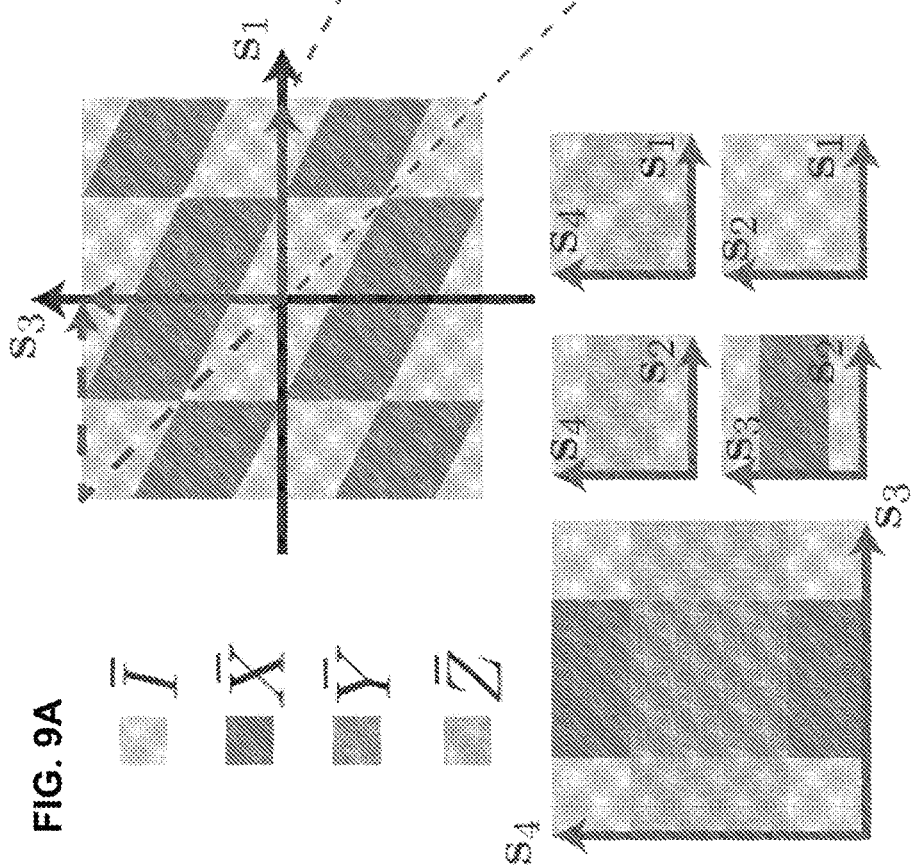
FIG. 9A depicts the effect of translation errors in the $D_4$ lattice code, according to some embodiments.

FIG. 9A depicts the effect of translation errors in the $D_4$ code, with logical operations applied as a function of the initial translation error in the planes given by $\text{span}(s_j, s_k)$. FIG. 9B depicts the logical error probability as a function of the length of a translation error along $s_1$. The full quantum model (dots) is compared with the classical model (dashed lines) The inset of FIG. 9B shows the integrated logical error probability given that an error $\eta s_1$ occurred, with $\eta$ sampled uniformly.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Further, though advantages of the present invention are indicated, it should be appreciated that not every embodiment of the technology described herein will include every described advantage. Some embodiments may not implement any features described as advantageous herein and in some instances one or more of the described features may be implemented to achieve further embodiments. Accordingly, the foregoing description and drawings are by way of example only.

Various aspects of the present invention may be used alone, in combination, or in a variety of arrangements not specifically described in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value. The term "substantially equal" may be used to refer to values that are within ±20% of one another in some embodiments, within ±10% of one another in some embodiments, within ±5% of one another in some embodiments, and yet within ±2% of one another in some embodiments.

The term "substantially" may be used to refer to values that are within ±20% of a comparative measure in some embodiments, within ±10% in some embodiments, within ±5% in some embodiments, and yet within ±2% in some embodiments. For example, a first direction that is "substantially" perpendicular to a second direction may refer to a first direction that is within ±20% of making a 90° angle with the second direction in some embodiments, within ±10% of making a 90° angle with the second direction in some embodiments, within ±5% of making a 90° angle with the second direction in some embodiments, and yet within ±2% of making a 90° angle with the second direction in some embodiments.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method of operating a circuit quantum electrodynamics system that includes an ancilla qubit dispersively coupled to a multimode bosonic system having a plurality of modes and operating as a logical qubit, the method comprising:
repeatedly performing a sequence of operations that autonomously detect and correct quantum errors arising in a state of the ancilla qubit and/or in a state of the logical qubit, the sequence of operations comprising:
applying a first drive waveform to each of the plurality of modes of the multimode bosonic system, wherein the first drive waveform changes the state of the ancilla qubit dependent on whether an error has occurred in the state of the ancilla qubit and/or in the state of the logical qubit;
subsequent to applying the first drive waveform, applying a second drive waveform to the ancilla qubit; and
subsequent to applying the second drive waveform, applying a third drive waveform to each of the plurality of modes of the multimode bosonic system, wherein the third drive waveform corrects the error that occurred in the state of the ancilla qubit and/or in the state of the logical qubit.

2. The method of claim 1, wherein the sequence of operations further comprises:
applying a fourth drive waveform to each of the plurality of modes of the multimode bosonic system, wherein the fourth drive waveform changes the state of the ancilla qubit dependent on whether an error has occurred in the state of the ancilla qubit;
subsequent to applying the fourth drive waveform, applying a fifth drive waveform to the ancilla qubit.

3. The method of claim 1, wherein the sequence of operations further comprises applying a sixth drive waveform to the ancilla qubit to drive the ancilla qubit into an excited state.

4. The method of claim 1, wherein the multimode bosonic system comprises a plurality of distinct bosonic systems each having one or more modes.

5. The method of claim 1, wherein the multimode bosonic system comprises a single bosonic system having a plurality of modes.

6. The method of claim 1, wherein the ancilla qubit is a transmon qubit.

7. The method of claim 1, wherein the multimode bosonic system comprises two microwave cavities coupled to the ancilla qubit.

8. The method of claim 1, wherein the sequence of operations autonomously detect and correct quantum errors arising in the state of the ancilla qubit, and wherein the first drive waveform changes the state of the ancilla qubit dependent on whether an error has occurred in the state of the logical qubit.

9. The method of claim 1, further comprising performing a plurality of quantum gates on a logical state of the logical qubit.

10. The method of claim 9, wherein the plurality of quantum gates are performed interleaved with instances of the sequence of operations, such that the method comprises at least performing a first quantum gate, followed by performing the sequence of operations a first time, followed by performing a second quantum gate, followed by performing the sequence of operations a second time.

11. The method of claim 1, wherein the first drive waveform changes the state of the ancilla qubit by imparting a change of phase to the state of the ancilla qubit.

12. The method of claim 1, wherein the first drive waveform further changes a state of one or more modes of the multimode bosonic system.

13. A system, comprising:
a circuit quantum electrodynamics system that includes an ancilla qubit dispersively coupled to a multimode bosonic system having a plurality of modes and operating as a logical qubit;
at least one non-transitory computer readable medium storing a plurality of drive waveforms;

at least one controller configured to:
- apply a first drive waveform of the plurality of drive waveforms to each of the plurality of modes of the multimode bosonic system, wherein the first drive waveform changes a state of the ancilla qubit dependent on whether an error has occurred in the state of the ancilla qubit;
- subsequent to applying the first drive waveform, apply a second drive waveform of the plurality of drive waveforms to the ancilla qubit; and
- subsequent to applying the second drive waveform, apply a third drive waveform of the plurality of drive waveforms to each of the plurality of modes of the multimode bosonic system, wherein the third drive waveform corrects the error that occurred in the state of the ancilla qubit.

14. The system of claim 13, wherein the multimode bosonic system comprises a plurality of distinct bosonic systems each having one or more modes.

15. The system of claim 13, wherein the multimode bosonic system comprises a single bosonic system having a plurality of modes.

16. The system of claim 13, wherein the ancilla qubit is a transmon qubit.

17. The system of claim 13, wherein the multimode bosonic system comprises two microwave cavities coupled to the ancilla qubit.

18. The system of claim 13, wherein the at least one controller is further configured to:
- apply a fourth drive waveform to each of the plurality of modes of the multimode bosonic system, wherein the fourth drive waveform changes the state of the ancilla qubit dependent on whether an error has occurred in the state of the ancilla qubit;
- subsequent to applying the fourth drive waveform, apply a fifth drive waveform to the ancilla qubit.

19. The system of claim 13, wherein the at least one controller is further configured to apply a sixth drive waveform to the ancilla qubit to drive the ancilla qubit into an excited state.

20. The system of claim 13, wherein the first drive waveform changes the state of the ancilla qubit by imparting a change of phase to the state of the ancilla qubit.

* * * * *